US007895525B2

(12) United States Patent
Rees et al.

(10) Patent No.: US 7,895,525 B2
(45) Date of Patent: Feb. 22, 2011

(54) METHOD OF MANAGING MULTIPLE RESOURCE IDENTIFIERS

(75) Inventors: Robert Thomas Owen Rees, Bristol (GB); Roger Brian Gimson, Bristol (GB); John William Lumley, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 11/335,818

(22) Filed: Jan. 20, 2006

(65) Prior Publication Data

US 2006/0173919 A1 Aug. 3, 2006

(30) Foreign Application Priority Data

Jan. 21, 2005 (GB) ................................ 0501250.5

(51) Int. Cl.
*G06F 3/00* (2006.01)

(52) U.S. Cl. ....................... 715/760; 715/744; 715/234; 715/206; 715/208; 717/106; 717/110; 709/219

(58) Field of Classification Search ................. 715/760, 715/744, 232–242, 206, 208; 707/104.1; 717/106, 110; 709/210, 238
See application file for complete search history.

(56) References Cited

U.S. PATENT DOCUMENTS 5,706,501 A 1/1998 Horikiri et al.
5,890,171 A 3/1999 Blumer et al.
6,243,088 B1 6/2001 McCormack et al.
6,453,350 B1 9/2002 Factor
6,745,206 B2 6/2004 Mandler et al.
6,910,040 B2 6/2005 Emmick et al.
2001/0044825 A1* 11/2001 Barritz ....................... 709/203
2003/0084095 A1* 5/2003 Hayden ....................... 709/203
2004/0024848 A1* 2/2004 Smith et al. ................. 709/219
2004/0068694 A1* 4/2004 Kaler et al. ................. 715/513
2004/0117769 A1 6/2004 Lauzon et al.
2008/0016025 A1* 1/2008 Beynon et al. ................. 707/1

OTHER PUBLICATIONS

R. Fielding; "Relative Uniform Resource Locators"; ftp://ftp.rfc-editor.org/in-notes/rfc1808.txt; Jun. 1995.
T. Berners-Lee; "Uniform Resources Indentifiers (URI): Generic Syntax"; ftp://ftp.rfc-editor.org/in-notes/rfc2396.txt; Aug. 1998.
Evans et al., "The Resource Locator Service: fixing a flaw in the web," Computer Networks 37 (2001) 307-330.
Berners-Lee, Tim, "Cool URIs don't change," 1998 W3C Style.

* cited by examiner

*Primary Examiner*—Weilun Lo
*Assistant Examiner*—Rashedul Hassan

(57) ABSTRACT

A method of managing multiple resource identifiers in a machine readable document includes allocating one or more resource identifiers to a context. A context name is associated to the context and the context name and resource identifier are associated in the document.

25 Claims, 6 Drawing Sheets

METHOD OF MANAGING MULTIPLE RESOURCE IDENTIFIERS

FIELD OF THE INVENTION

The invention relates to a method of managing multiple resource identifiers.

BACKGROUND OF THE INVENTION

With the growing complexity of multiple resource containing documents such as word processing documents or web pages including as resources multiple images, operations such as altering, merging or moving the documents between locations require increasing care to ensure that content is not lost or degraded as a result. This is especially the case for documents including multiple resources where the resources are located remotely and identified in the document by a resource identifier such as a resource address for retrieval.

BRIEF SUMMARY OF THE INVENTION

A method of managing multiple resource identifiers in a machine readable document comprises allocating one or more resource identifiers to a context. A context name is assigned to the context and a resource identifier and a corresponding context name are associated in the document.

BRIEF DESCRIPTION OF THE DRAWINGS

Embodiments of the invention will now be described, by way of example only, with reference to the drawings of which.

DETAILED DESCRIPTION OF THE INVENTION

For the purposes of clarity of explanation, implementation of the method described herein is set out in relation to a document as described below with reference to FIGS. 1 to 3. However it will be appreciated that the method can be extended to any appropriate document type and file structure, of any level of complexity.

Figure 1:
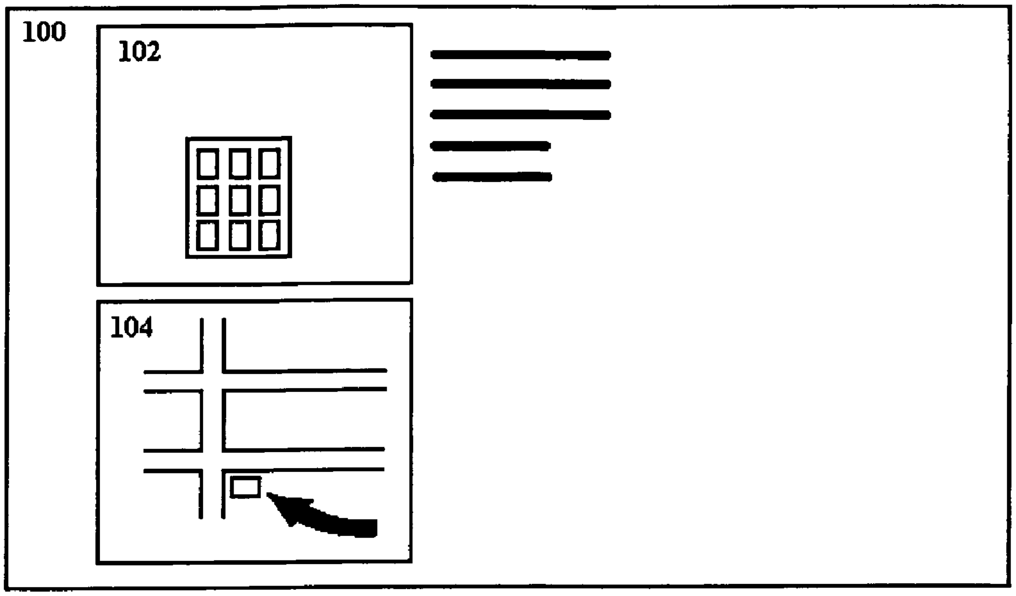
FIG. 1 is a schematic diagram showing a screen representation of a first document including resources.

Referring to FIG. 1 an example of a representation of a first document f1, reference numeral 100 is shown, as it would appear on a computer screen, for example. The representation may be of a web page hosted by a corporate entity, for example on a corporate website and having as resources corporate images in jpeg format r1, reference 102, and r2, reference 104.

In order to be interpreted and represented by a computer, the page is represented in machine readable form such as Hyper Text Markup Language (HTML) or Extensible Markup Language (XML) with references to the location of r1, r2 in other locations using resource identifiers such as Universal Resource Locators (URL) or Universal Resource Identifiers (URI), for example using an absolute resource identifier such as an internet web address independent of the location of the document, or a relative resource identifier which gives the location of the resource using the location of the document containing the reference as a starting point, for example a reference to a local directory in which the document and images are all stored. In order to display the document, the machine reads the representation in machine readable language, retrieves the resources and displays the compiled document. By relying on resource identifiers, it is possible to represent very large or volatile resources within the document without making the document itself excessively long, and without duplicating the resources, or having to update multiple copies of frequently changing resources. It will be appreciated, of course, that the resources can be any appropriate type for example metadata or font information.

If a document containing relative references, but not the referenced resources themselves, is moved, or the content of the document is incorporated into another document to form a merged document, it is necessary to ensure that relative references within the document continue to point to the correct resource location. Conversely, where a directory contains both a document containing absolute references, and, separately, the referenced resources, if the directory is moved then, as the resources have moved, it is necessary to revise the absolute references in the moved document to point to the correct resource location.

Figure 2:
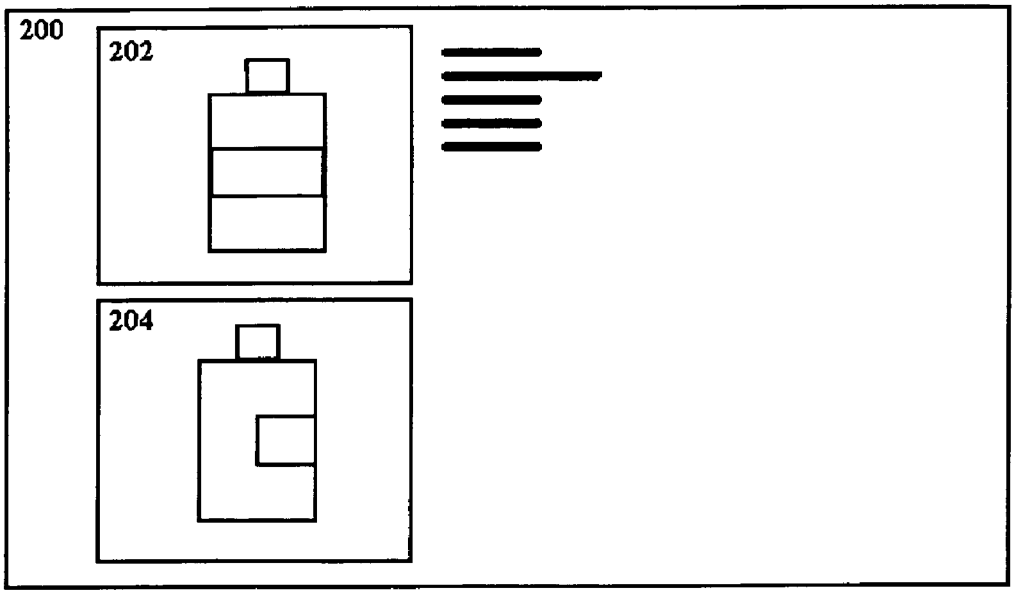
FIG. 2 is a schematic diagram showing a screen representation of a second document including resources.
Figure 3:
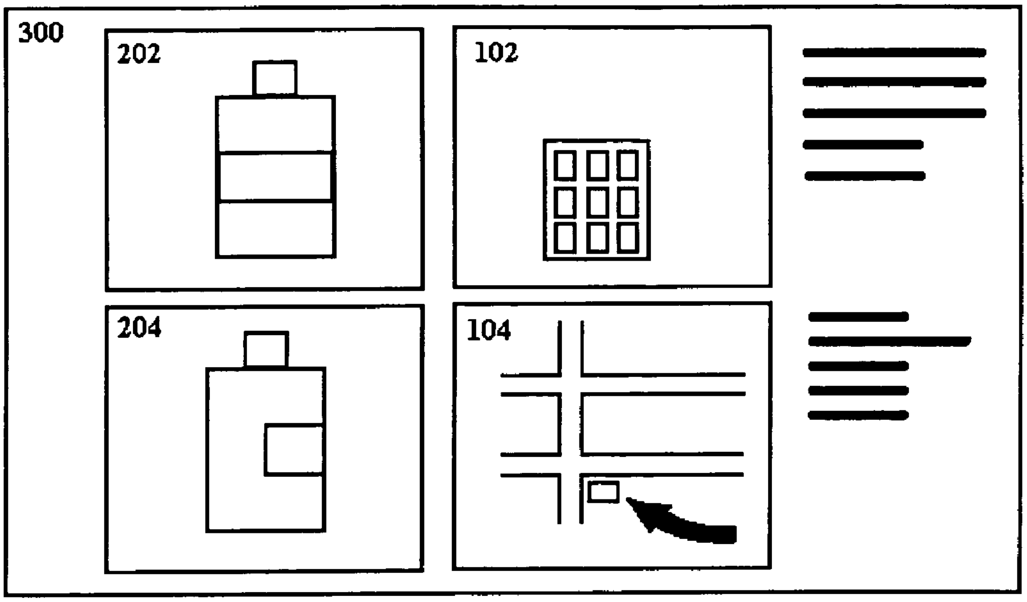
FIG. 3 is a schematic diagram showing screen representation of the merged first and second documents.

A simple operation in relation to such a document can be understood with further reference to FIGS. 2 and 3. Referring to the screen representation shown in FIG. 2, a second document f2, reference numeral 200 comprises a web page provided by a supplier to the corporate entity and including jpeg images r3, reference numeral 202 and r4, reference numeral 204, once again represented in the document itself by resource identifiers pointing to a resource location. The merge operation merges the two documents to give a merged document 300 as shown in the screen representation of FIG. 3 which includes all of the images r1 to r4.

Figure 4:
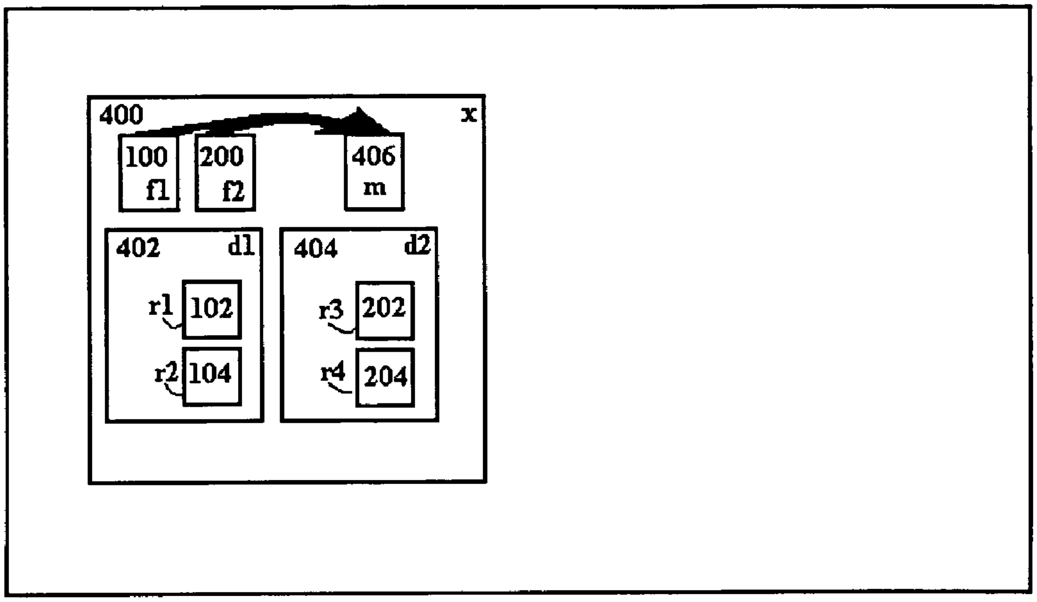
FIG. 4 shows a file architecture in which documents are merged.

Turning now to FIG. 4, a corresponding directory structure supporting the documents and merge operation described above with reference to FIG. 1 to FIG. 3, is shown. A directory x, reference numeral 400 includes files f1, f2, reference numerals 100, 200 as described above, and directories d1, d2, reference numerals 402, 404 containing images r1, r2, reference numerals 102, 104 and r3, r4, reference numerals 202, 204 respectively.

This structure can be represented as a file directory tree in listing (1) as follows:

```
+ x                (1)
  + f1.xml
  + f2.xml
  + d1
  | + r1.jpg
  | + r2.jpg
  + d2
```

-continued

```
+ r3.jpg
+ r4.jpg
```

In xml, document f1 shown as 100 in FIG. 1 can be expressed in listing (2) as:

```
<!-- file1 x/f1.xml basic -->                    (2)
<a>
  <b>
    <r ref="d1/r1.jpg"/>
  </b>
  <c>
    <r ref="d1/r2.jpg"/>
  </c>
</a>
```

And document f2 shown as 200 in FIG. 2 can be represented as:

```
<!-- file2 x/f2.xml basic -->                    (3)
<a>
  <b>
    <r ref="d2/r3.jpg"/>
  </b>
  <d>
    <r ref="d2/r4.jpg"/>
  </d>
</a>
```

Accordingly, document f1 includes in parent element <a>, child elements <b> and <c> each containing an element <r> having a respective attribute. For example element <r> in element b has an attribute ref="d1/r1.jpg"/. When the document is read by the machine the URL for resource r1 is resolved to x/d1/r1.jpg and so forth.

Merging documents x/f1.xml and x/f2.xml creates a document x/m.xml, that is to say document m reference numeral 406 in FIG. 4. The result of the merge of the basic form documents is expressed in XML as:

```
<!-- merged file x/m.xml basic -->               (4)
<a>
  <b>
    <r ref="d1/r1.jpg"/>
    <r ref="d2/r3.jpg"/>
  </b>
  <c>
    <r ref="d1/r2.jpg"/>
  </c>
  <d>
    <r ref="d2/r4.jpg"/>
  </d>
</a>
```

In the case shown, as the output of the merge, document m, is going to a file in the same directory as the inputs, f1 and f2 the references remain unchanged, but as will be seen below, with more complex operations additional changes are required.

Figure 5:
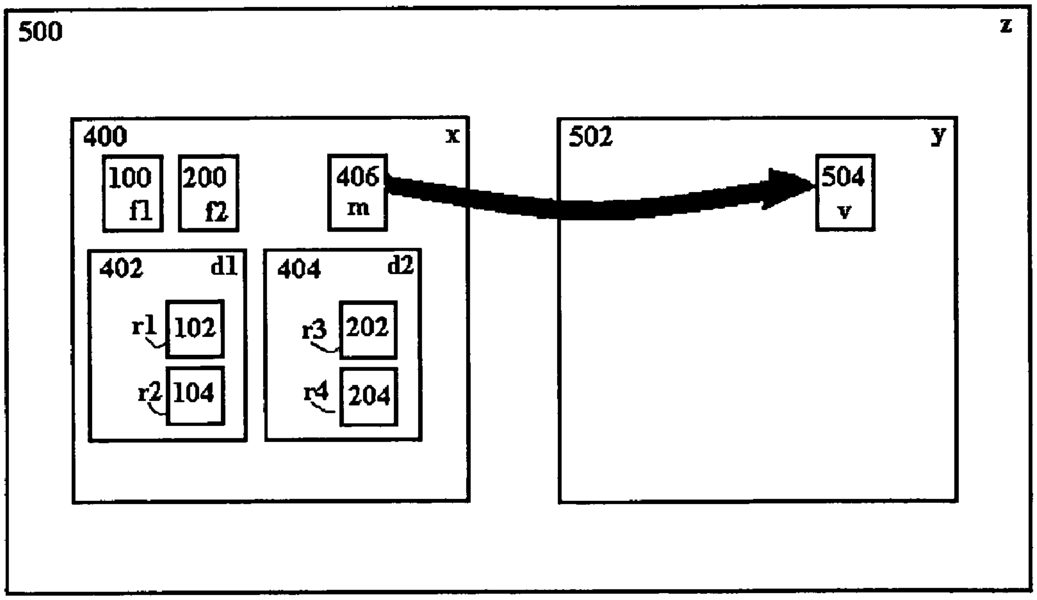
FIG. 5 shows a file architecture in which a merged document is moved.

For example referring to FIG. 5 where directory x is in a super-directory z, reference numeral 500 which also contains a directory y, reference numeral 502 and it is desired to move the merged file m from directory x to directory y it will be seen that the file and resources are now in separate locations. In particular the document is moved from x/m.xml to y/v.xml, i.e. file v, reference numeral 504. Because the references are interpreted relative to the document, moving the document to a different context means that the references must be adjusted.

In XML the moved document v is expressed as follows:

```
<!-- move basic -->                              (5)
<a>
  <b>
    <r ref="../x/d1/r1.jpg"/>
    <r ref="../x/d2/r3.jpg"/>
  </b>
  <c>
    <r ref="../x/d1/r2.jpg"/>
  </c>
  <d>
    <r ref="../x/d2/r4.jpg"/>
  </d>
</a>
```

The "../x" operator, indicates that it is necessary to go up into the super directory containing directory y and then down into directory x to find the relevant file d1, d2 containing the resource r1-r4. As will be seen, as a result, each reference must be adjusted in order that the document v can be machine read such that resources r1 to r4 can be retrieved from directory x.

Figure 6:
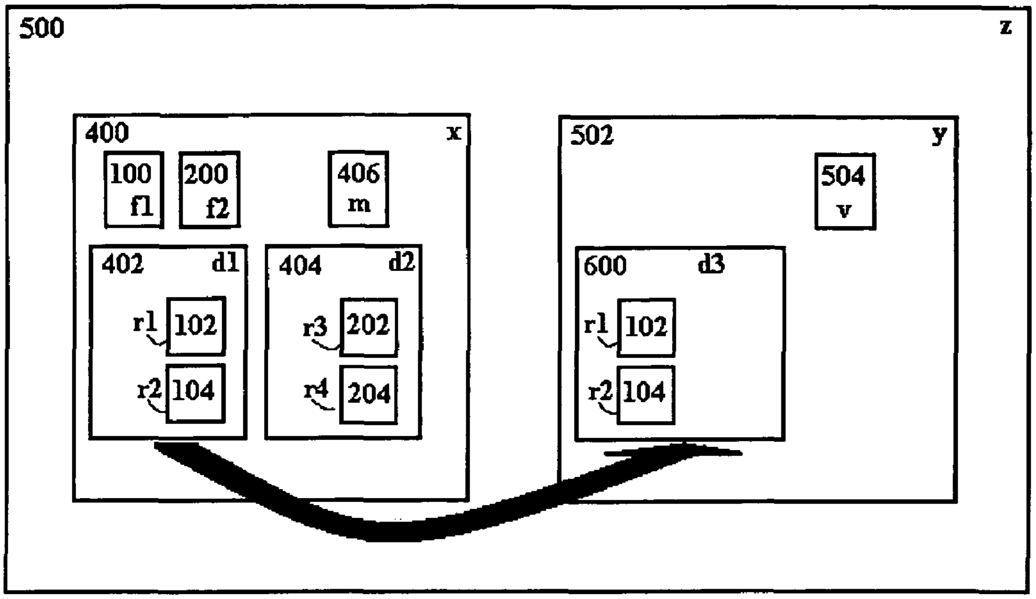
FIG. 6 shows a file architecture in which resources are moved.

A further operation in which rewriting of the resource references is required is described with reference to FIG. 6. In this instance it is desired to move resources r1 and r2, that is the contents of x/d1 into a folder d3, reference numeral 600 in directory y, that is the resources are moved from x/d1 to y/d3. The document is as it was after the move to y/v.xml and remains in that location, reference numeral 504. In practice this might arise, for example, because copies or replacements of resources r1, r2 were required, for example because of the requirement for a different version of the resource for a different type of hardware, or because of updates to the resources, for example updated, revised images.

The basic form document after the move is expressed in XML as:

```
<!-- move basic -->                              (6)
<a>
  <b>
    <r ref="d3/r1.jpg"/>
    <r ref="../x/d2/r3.jpg"/>
  </b>
  <c>
    <r ref="d3/r2.jpg"/>
  </c>
  <d>
    <r ref="../x/d2/r4.jpg"/>
  </d>
</a>
```

As a result those references previously began "../x/d1" now begin "d3", the others being unchanged from listing 5. As can be seen yet further rewriting of the references is hence required.

Figure 7:
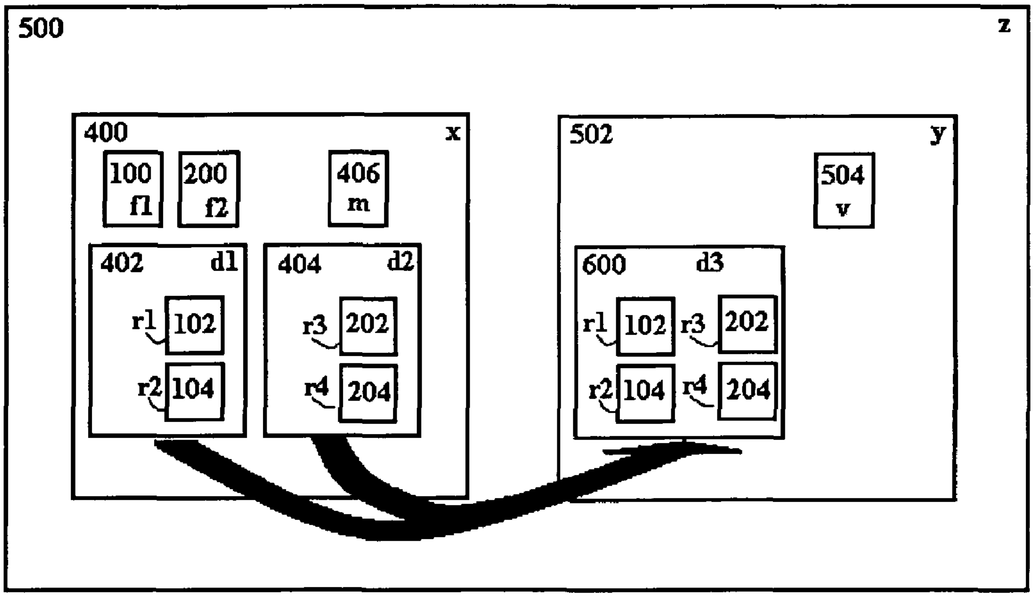
FIG. 7 shows a file architecture in which further resources are moved.

Yet a further operation requiring rewriting of the references is described with reference to FIG. 7, which shows the result of further moving the resources from x/d2, that is r3 and r4, to y/d3. As a result, as can be seen from FIG. 7, d3 now contains all of r1 to r4. The document can now be expressed in XML as:

```
<!-- move basic -->                                  (7)
<a>
  <b>
    <r ref="d3/r1.jpg"/>
    <r ref="d3/r3.jpg"/>
  </b>
  <c>
    <r ref="d3/r2.jpg"/>
  </c>
  <d>
    <r ref="d3/r4.jpg"/>
  </d>
</a>
```

Figure 8:
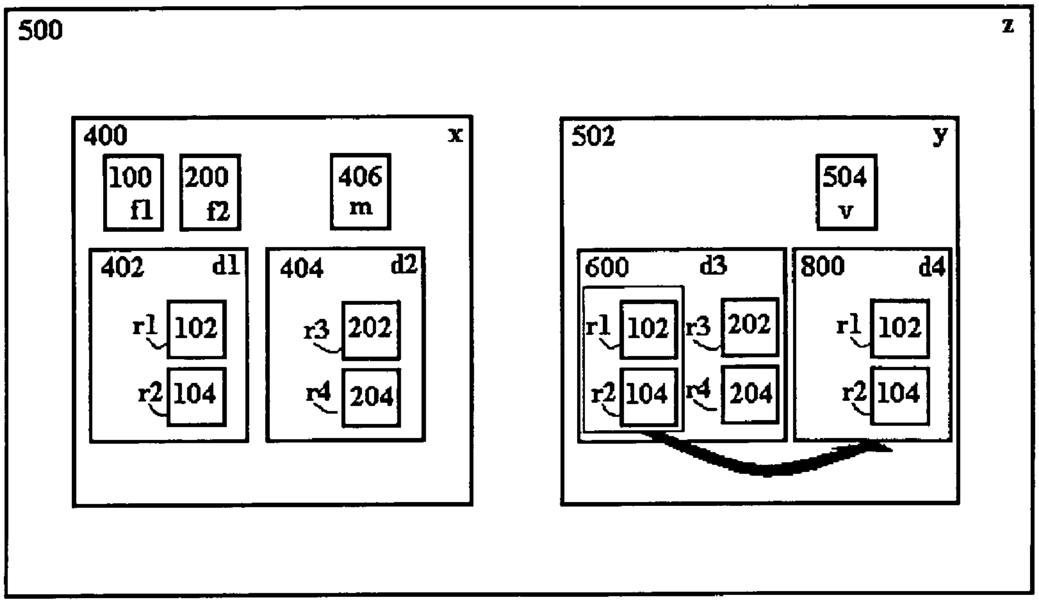
FIG. 8 shows a file architecture in which resources are moved once again.

Although the form has in fact become simpler as all documents are now in the directory y, it will be seen that information has been lost. In particular if it was now desired to move all of the resources that were originally in x/d1 the only way would be to trace the history of the changes to identify that those resources were r1 and r2. For example, referring to FIG. 8, it is desired to move the original content of x/d1 from y/d3 to a folder y/d4, reference 800. As all the information that distinguishes the original location of the moved resources has been lost, it is necessary to look up each resource on the list to see if it should be moved and hence decide whether or not to adjust its reference, as can be seen from listing (7) above in which the relationship between resources r1 and r2, and original folder d1, is no longer derivable.

It will be seen that as operations and transformations performed on documents containing resource identifiers for resources become more complex, the burden of rewriting documents such that resources are correctly resolved becomes more significant. As a result, in complex work flows, or during complex transformations such as documents crossing firewalls, significant administrative or processing time or effort may be required to ensure that all resource identifiers are correctly mapped. Furthermore, because during rewrites some information is lost, backtracking is required to identify correct mappings for resource identifiers in some instances. Such situations can arise for example in an automated document processing system where intermediate and output documents are created in different places from the inputs, where documents are generated on a first, authoring system and later processed on a production system.

An existing approach applied in relation to HTML documents is to make use of a "BASE" element including an absolute URI in relation to which relative URI's in the document are interpreted. In the case of XML documents, xml:base attributes can be included allowing interpretation of URI's in an element with an appropriate attribute. The URI in the xml:base attribute may be relative and hence locked to the structure of the document and the references in the document are resolved against the base attribute, all sharing the address path component it represents. As will be seen from the following discussion, however, xml:base still requires significant rewriting either of the xml:base attribute itself or of the URI's in the remainder of the document.

For example in the case of the simple expression of the documents shown in FIG. 1, represented in its basic form by listing (2) and (3), the relationship can be expressed as follows:

```
<!-- file1 x/f1.xml with xml:base -->                 (8)
<a xml:base="d1/x.xml">
```

-continued

```
  <b>
    <r ref="r1.jpg"/>
  </b>
  <c>
    <r ref="r2.jpg"/>
  </c>
</a>
```

For the file f1, and for f2:

```
<!-- file2 x/f2.xml with xml:base -->                 (9)
<a xml:base="d2/x.xml">
  <b>
    <r ref="r3.jpg"/>
  </b>
  <d>
    <r ref="r4.jpg"/>
  </d>
</a>
```

The xml:base attributes hence provides a context for references contained within the element and it can be seen that once again resource r1 resolves with the base to d1/r1.jpg discarding the path element x.xml, and so forth.

In the case of merging two documents d1, d2, to arrive at a merged document as shown in FIG. 4, then the relationship expressed in basic form in listing (4) can be expressed in xml:base in various ways. In a first option a single xml:base d1/x.xml, is adopted as a result of which the references from file d2 must be correspondingly adjusted as shown below:

```
<!-- merged file x/m.xml xml:base option 1 -->        (10)
<!-- adopt file1 base, modify references from file2 -->
<a xml:base="d1/x.xml">
  <b>
    <r ref="r1.jpg"/>
    <r ref="../d2/r3.jpg"/>
  </b>
  <c>
    <r ref="r2.jpg"/>
  </c>
  <d>
    <r ref="../d2/r4.jpg"/>
  </d>
</a>
```

In particular it will be seen that the "../" operator is used as discussed above.

In an alternative option a top level xml:base is once again selected as d1/x.xml but then nested xml:base attributes are incorporated in each element as appropriate. In this case the references for the resources found in d2 are adjusted accordingly:

```
<!-- merge with xml:base option 2 -->                 (11)
<!-- adopt file1 base, add xml:base as high as possible -->
<a xml:base="d1/x.xml">
  <b>
    <r ref="r1.jpg"/>
    <r xml:base="../d2/x.xml" ref="r3.jpg"/>
  </b>
  <c>
    <r ref="r2.jpg"/>
  </c>
```

-continued

```
    <d xml:base="../d2/x.xml">
        <r ref="r4.jpg"/>
    </d>
</a>
```

According to a third option xml:base is introduced for each reference, avoiding nesting of xml:base:

```
<!-- merge with xml:base option 3 -->                                    (12)
<!-- push all xml:base down as far as necessary -->
<a>
    <b>
        <r xml:base="d1/x.xml" ref="r1.jpg"/>
        <r xml:base="d2/x.xml" ref="r3.jpg"/>
    </b>
    <c xml:base="d1/x.xml">
        <r ref="r2.jpg"/>
    </c>
    <d xml:base="d2/x.xml">
        <r ref="r4.jpg"/>
    </d>
</a>
```

In the case of all of these options it will be seen that complex rewriting of the document is required in either form.

In the case of the move operation described with reference to FIG. 5 above in which a merged document m in directory x is transferred to document v in directory y, the document expressed in basic form in listing (5) can instead be expressed using xml:base. For example in relation to the document expressed in listing 10 above, corresponding to the first option for expressing a merged document, the moved document can be represented as:

```
<!-- move with xml:base option 1 -->                                     (13)
<a xml:base="../x/d1/x.xml">
    <b>
        <r ref="r1.jpg"/>
        <r ref="../d2/r3.jpg"/>
    </b>
    <c>
        <r ref="r2.jpg"/>
    </c>
    <d>
        <r ref="../d2/r4.jpg"/>
    </d>
</a>
```

In particular it will be seen that the xml:base at the top level has been adjusted appropriately using the "../x" operator.

In relation to the second xml:base option for a merged document (listing (11), the moved document is revised as:

```
<!-- move with xml:base option 2 -->                                     (14)
<a xml:base="../x/d1/x.xml">
    <b>
        <r ref="r1.jpg"/>
        <r xml:base="../d2/x.xml" ref="r3.jpg"/>
    </b>
    <c>
        <r ref="r2.jpg"/>
    </c>
    <d xml:base="../d2/x.xml">
        <r ref="r4.jpg"/>
    </d>
</a>
```

In this case, once again, the top level xml:base is once again rewritten using the "../x" operator.

Referring to the third xml:base option for a merged document as shown in listing 12, the moved document is revised as follows:

```
<!-- move with xml:base option 3 -->                                     (15)
<a>
    <b>
        <r xml:base="../x/d1/x.xml" ref="r1.jpg"/>
        <r xml:base="../x/d2/x.xml" ref="r3.jpg"/>
    </b>
    <c xml:base="../x/d1/x.xml">
        <r ref="r2.jpg"/>
    </c>
    <d xml:base="../x/d2/x.xml">
        <r ref="r4.jpg"/>
    </d>
</a>
```

It will be seen that here all of the xml:base attributes have been modified using the ../x operator.

Referring now to the transformation described above with reference to FIG. 6 in which resources are r1, r2 are moved from x/d1 to y/d3, described above with reference in the basic form by listing (6), adjustment is again required in the xml:base approach. For the three possible forms of the merged and moved documents there are various possible ways of rewriting the document.

A first approach to transforming the first form of moved document described in listing (13) is to adjust the references using the "../y" operator for resources r1 and r2, leaving xml:base at the top unchanged, as follows:

```
<!-- move with xml:base option 1.1 -->                                   (16)
<a xml:base="../x/d1/x.xml">
    <b>
        <r ref="../../y/d3/r1.jpg"/>
        <r ref="../d2/r3.jpg"/>
    </b>
    <c>
        <r ref="../../y/d3/r2.jpg"/>
    </c>
    <d>
        <r ref="../d2/r4.jpg"/>
    </d>
</a>
```

However it will be seen that the use of the top level xml:base in fact introduces additional rewriting requirement.

The second approach to transforming the moved document described in listing (13) is to rewrite the top-level xml:base as d3/x.xml. However this still requires rewriting of those references to resources that did not move as can be seen from the following:

```
<!-- move with xml:base option 1.2 -->                                   (17)
<a xml:base="d3/x.xml">
    <b>
        <r ref="r1.jpg"/>
        <r ref="../../x/d2/r3.jpg"/>
    </b>
    <c>
        <r ref="r2.jpg"/>
    </c>
    <d>
        <r ref="../../x/d2/r4.jpg"/>
    </d>
</a>
```

Turning to the second form of moved document set out in listing (14), in a first transformation xml:base is left unchanged and the references to moved resources adjusted as follows:

```
<!-- move with xml:base option 2.1 -->                    (18)
<a xml:base="../x/d1/x.xml">
  <b>
    <r ref="../../y/d3/r1.jpg"/>
    <r xml:base="../d2/x.xml" ref="r3.jpg"/>
  </b>
  <c>
    <r ref="../../y/d3/r2.jpg"/>
  </c>
  <d xml:base="../d2/x.xml">
    <r ref="r4.jpg"/>
  </d>
</a>
```

Alternatively, the top level xml:base is changed and the relevant references adjusted:

```
<!-- move with xml:base option 2.2 -->                    (19)
<a xml:base="d3/x.xml">
  <b>
    <r ref="r1.jpg"/>
    <r xml:base="../../x/d2/x.xml" ref="r3.jpg"/>
  </b>
  <c>
    <r ref="r2.jpg"/>
  </c>
  <d xml:base="../../x/d2/x.xml">
    <r ref="r4.jpg"/>
  </d>
</a>
```

Turning to the third form of the moved document, as described in listing (15), all of the elements require rewriting in much the same manner as the basic form described in listing (6), as follows:

```
<!-- move with xml:base option 3 -->                      (20)
<a>
  <b>
    <r xml:base="d3/x.xml" ref="r1.jpg"/>
    <r xml:base="../x/d2/x.xml" ref="r3.jpg"/>
  </b>
  <c xml:base="d3/x.xml">
    <r ref="r2.jpg"/>
  </c>
  <d xml:base="../x/d2/x.xml">
    <r ref="r4.jpg"/>
  </d>
</a>
```

Referring now to the transformations described above with reference to FIG. 7 in which the contents of x/d2, resources r3 and r4 are also moved to y/d3, as described in listing (7), it will be seen that further significant adjustment of the various xml:base forms described above is required as will be apparent to the skilled reader and as not set forth herein merely for the purposes of ease of reference. Similarly in the case of the transformation described above with reference to FIG. 8 which the original contents of x/d1, resources r1 and r2, are moved to a new y/d4, it is necessary to refer to a history of previous transformations to identify which resources require moving in much the same manner as the basic form, as discussed above, in all but the most complex of the xml:base forms. That is to say, xml:base formulations which are simplest to manipulate in relation to other transformations lose the information required to perform the operation "transfer previous contents of x/d1 to new folder y/d4" in a straightforward manner.

According to the approach described herein, therefore, a simplified form for managing multiple resource identifiers in a machine readable document is provided.

In overview, one or more resource identifiers in the machine readable document are allocated to a context which can represent a common name for a group of resources. For example with reference to FIG. 4, resources r1 and r2 can be allocated to a context c1, hence providing additional information about the origin of those resources and allowing them to be grouped conveniently if necessary. In the case of the example discussed above with reference to FIGS. 1 to 3, the context c1 may relate to corporate resources whereas another context c2 may relate to supplier resources. According to the method described herein, a context name is assigned to the context and the resource identifier and the assigned context name are then associated.

In an embodiment a context map then maps a context name to a resource locator as will be shown in more detail below, each document hence including a mapping of a context name to a resource locator URI and, in each reference, both the relative reference for a resource and the associated context name. The context names therefore comprise context map entries containing URI's that can be interpreted relative to the document but which also may be absolute if appropriate to the application. Because of the allocation of multiple resources to contexts and the association of the context to respective URI's, transformations of the document can be accommodated simply by amendment of the naming context map. Furthermore groups of resources can be tracked because of the introduction of context names internal to the document such that resources showing a common context can be easily manipulated even after multiple transformation to a document.

For example in the case of the basic forms of documents expressed above in listings (2) and (3), or the xml:base form expressed in listings (8) and (9), according to the method described herein these are expressed as:

```
<!-- file1 x/f1.xml with NCM -->                          (21)
<a>
  <contexts>
    <context name="c1">d1/x.xml</context>
  </contexts>
  <b>
    <r ref="c1;r1.jpg"/>
  </b>
  <c>
    <r ref="c1;r2.jpg"/>
  </c>
</a>
```

for file f1, and, for file f2 as:

```
<!-- file2 x/f2.xml with NCM -->                          (22)
<a>
  <contexts>
    <context name="c2">d2/x.xml</context>
  </contexts>
  <b>
    <r ref="c2;r3.jpg"/>
  </b>
```

-continued

```
    <d>
      <r ref="c2;r4.jpg"/>
    </d>
  </a>
```

"c1" and "c2" are context names internal to the document for context map entries. It can be seen that each reference is then expressed as "context name; relative resource reference" allowing resolution, for example for resource r1, to d1/r1.jpg.

In relation to the merge operation discussed above with reference to FIG. 4 and in listing (4), in the case of the method described herein, the merged document is simply expressed as:

```
<!-- merge with NCM -->                                   (23)
<a>
  <contexts>
    <context name="c1">d1/x.xml</context>
    <context name="c2">d2/x.xml</context>
  </contexts>
  <b>
    <r ref="c1;r1.jpg"/>
    <r ref="c2;r3.jpg"/>
  </b>
  <c>
    <r ref="c1;r2.jpg"/>
  </c>
  <d>
    <r ref="c2;r4.jpg"/>
  </d>
</a>
```

In particular it can be seen that the references within the document are not changed, and the context maps are simply concatenated.

Referring to the move operation described above with reference to FIG. 5 and listing (5), the document incorporating a naming context map is simply revised by changing the contexts to incorporate the "../x" operator, the references remaining the same:

```
<!-- move with NCM -->                                    (24)
<a>
  <contexts>
    <context name="c1">../x/d1/x.xml</context>
    <context name="c2">../x/d2/x.xml</context>
  </contexts>
  <b>
    <r ref="c1;r1.jpg"/>
    <r ref="c2;r3.jpg"/>
  </b>
  <c>
    <r ref="c1;r2.jpg"/>
  </c>
  <d>
    <r ref="c2;r4.jpg"/>
  </d>
</a>
```

In the case of moving the resources as described above with reference to FIG. 6, and listing (6), the transformation when using a naming context map once again simply requires adjusting the appropriate context map entry in relation to context c1 as this identifies the resources previously in folder x/d1, now moved to y/d3:

```
<!-- move with NCM -->                                    (25)
<a>
  <contexts>
    <context name="c1">d3/x.xml</context>
    <context name="c2">../x/d2/x.xml</context>
  </contexts>
  <b>
    <r ref="c1;r1.jpg"/>
    <r ref="c2;r3.jpg"/>
  </b>
  <c>
    <r ref="c1;r2.jpg"/>
  </c>
  <d>
    <r ref="c2;r4.jpg"/>
  </d>
</a>
```

In relation to the transformation described above with reference to FIG. 7 and listing (7), once again it will be seen that only the context entry for c2 requires adjustment, the references remaining unchanged:

```
<!-- move with NCM -->                                    (26)
<a>
  <contexts>
    <context name="c1">d3/x.xml</context>
    <context name="c2">d3/x.xml</context>
  </contexts>
  <b>
    <r ref="c1;r1.jpg"/>
    <r ref="c2;r3.jpg"/>
  </b>
  <c>
    <r ref="c1;r2.jpg"/>
  </c>
  <d>
    <r ref="c2;r4.jpg"/>
  </d>
</a>
```

Finally, referring to the transformation described above with reference to FIG. 8, in which the resources originally in x/d1, resources r1 and r2, are moved to y/d4, because the context c1 has been preserved, yet again the references do not require rewriting, nor is any backtracking required to identify the relevant resources; it is simply necessary to rewrite the context mapping for c1 such that r1 and r2 resolve to d4/r1.jpg, d4/r2.jpg:

```
<!-- move with NCM -->                                    (27)
<a>
  <contexts>
    <context name="c1">d4/x.xml</context>
    <context name="c2">d3/x.xml</context>
  </contexts>
  <b>
    <r ref="c1;r1.jpg"/>
    <r ref="c2;r3.jpg"/>
  </b>
  <c>
    <r ref="c1;r2.jpg"/>
  </c>
  <d>
    <r ref="c2;r4.jpg"/>
  </d>
</a>
```

As a result it can be seen that a simple and highly trackable approach is provided for allowing resource identifiers to be managed and manipulated during complex transformations of documents, preserving the meaning of the names and multiple input documents when constructing an output document. It will be appreciated that the approaches described above can be applied in relation to any appropriate machine readable document for example using XML, HTML or xHTML, and in relation to any resource such as image, font, metadata or indeed an additional document.

The map entries may be absolute or relative and indeed the map itself can be internal to the document or external to the document and identified by an appropriate resource identifier itself. The document itself can take any appropriate form, being machine readable and having a machine identifiable beginning and end spanning the contents of the document, and taking any appropriate form such as a text or picture document, a web page, an audio file and so forth. Furthermore although a range of transformations and operations are described above, any appropriate transformation or combination thereof can be applied to the document. The resource identifier associated with each resource can be of any appropriate form as can the resource locator in the naming context map, resolvable to any appropriate address or pointer to the resource location.

It will further be appreciated that any appropriate naming scheme can be adopted, the context names effectively being used as names of sets of resources. In the case where internal context map entry names clash upon merging the documents, because the names are purely internal for the document any appropriate consistent renaming strategy can be adopted to resolve such clashes.

It will be further seen that, according to an embodiment, additional information can be embedded syntactically using the context name and resolution approach described above to provide additional functionality in the form of a processor identifiable component indicating a resolvable resource identifier. In particular where it is desired that a browser such as a JAVA-enabled browser is intended to resolve relative references within an XML document, it is desirable to identify relative references using an appropriate URL scheme name recognisable by the browser. Existing scheme names include http, file and mailto, and a further scheme name cref is assigned in relation to resolvable URI's although it will be appreciated any appropriate scheme name can be adopted. An appropriate implementation of this applies to the simple unmerged files f1 and f2 expressed using naming context maps in listings (21), (22) above can be expressed as:

```
<a xmlns:cref="http://hp.com/hpl/dpp/cref">
  <cref:context-map>
    <cref:context name="c1">d1/x.xml</cref:context>
  </cref:context-map>
  <b>
    <r ref="cref://c1/r1.jpg"/>
  </b>
  <c>
    <r ref="cref://c1/r2.jpg"/>
  </c>
</a>
```

for file f1, and for f2:

```
<a xmlns:cref="http://hp.com/hpl/dpp/cref">                    (29)
  <cref:context-map>
    <cref:context name="c2">d2/x.xml</cref:context>
```

-continued

```
  </cref:context-map>
  <b>
    <r ref="cref://c2/r3.jpg"/>
  </b>
  <d>
    <r ref="cref://c2/r4.jpg"/>
  </d>
</a>
```

It will be seen that according to this approach, the additional operation and transformations described above with reference to FIGS. 4 to 8 can be applied to the files incorporating simple changes to the name context map and which will not, therefore, be explained in detail here.

In that case it will be seen that appropriate recognition and resolution mechanisms can be incorporated into existing browsers or other resolution mechanisms allowing recognition of the cref URL scheme name and appropriate resolution of resources within a document accordingly and which can provide additional benefits as discussed below. The skilled person will be fully familiar with appropriate manners in which this approach can be implemented such that detailed description is not required here. As a result an existing URL resolver can be used to resolve references within documents of the type described herein with simple adjustment, for example enabled in JAVA.

Figure 9:
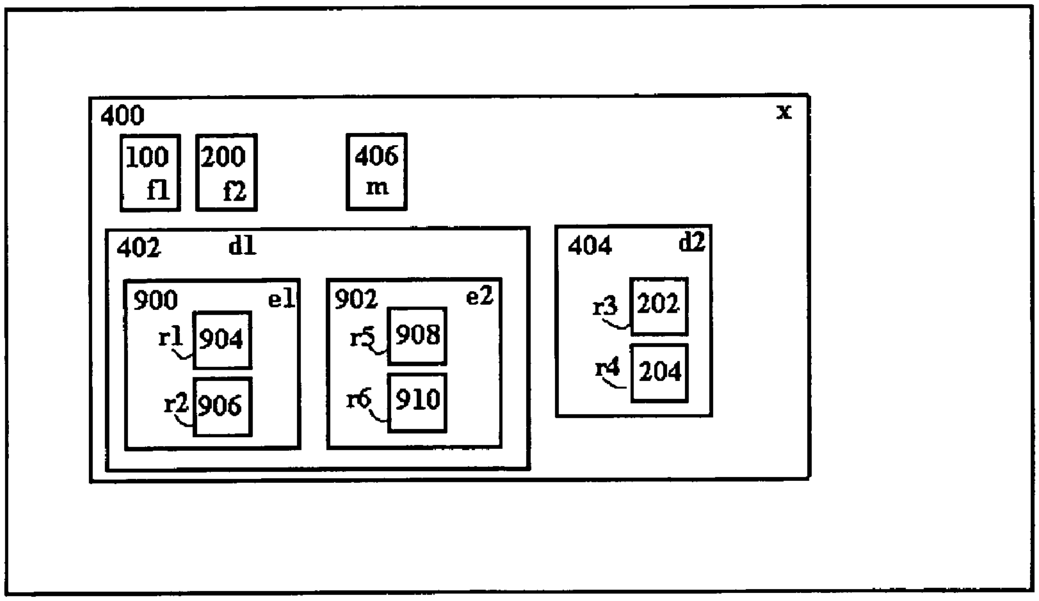
FIG. 9 shows a file architecture in which a context includes nested sub-contexts.

It will further be seen that the approach can be extended to embrace nested context names. For example referring to FIG. 9, where a similar scheme to that of FIGS. 4 to 8 is shown for clarity of explanation, it will be seen that directory d1 contains sub-directories e1, reference numeral 900 and e2, reference numeral 902. Resources r1, r2, reference numerals 904, 906 respectively, are held in e1 and additional references r5 and r6, reference numerals 908, 910 respectively are held in e2. Resources r3 and r4 are maintained in directory d2 as previously described. In this case it is desirable to maintain a first or primary context for all resources stored in directory d1. Reverting to the example described above with reference to FIGS. 1 to 3, for example, the directory d1 may contain all corporate resources. However additional second nested or sub-contexts may be required to identify the resources stored in the respective directories e1 and e2. For example e1 may relate to consumer resources held in the corporate directory whilst directory e2 may contain business resources maintained in the corporate directory. As a result the document f1 represented in the context naming map in listing (21) can be rewritten as:

```
<a>                                                             (30)
  <contexts>
    <context name="c1">d1/x.xml</context>
    <context name="c1a">c1;e1/x.xml</context>
    <context name="c1b">c1;e2/x.xml</context>
  </contexts>
  <b>
    <r ref="c1a;r1.jpg"/>
    <r ref="c1b;r5.jpg"/>
  </b>
  <c>
    <r ref="c1a;r2.jpg"/>
    <r ref="c1b;r6.jpg"/>
  </c>
</a>
```

As a result it can be seen that the contexts c1a, c1b relating to the resources stored in e1 and e2 respectively, themselves comprise sub-sets of, and are mapped, to a context c1 in the context naming map. As a result the reference “c1a; r1.jpg” resolves to x/d1/e1/r1.jpg and so forth.

File f2 remains unchanged as set out in listing (22).

Upon merging the files f1, f2 as described above with reference to FIG. 4, the references remain unchanged and the context map is concatenated, again as described above, and as shown below:

```
<?xml version=“1.0” encoding=“UTF-8”?>                    (31)
<a>
  <contexts>
    <context name=“c1”>d1/x.xml</context>
    <context name=“c1a”>c1;e1/x.xml</context>
    <context name=“c1b”>c1;e2/x.xml</context>
    <context name=“c2”>d2/x.xml</context>
  </contexts>
  <b>
    <r ref=“c1a;r1.jpg”/>
    <r ref=“c1b;r5.jpg”/>
    <r ref=“c2;r3.jpg”/>
  </b>
  <c>
    <r ref=“c1a;r2.jpg”/>
    <r ref=“c1b;r6.jpg”/>
  </c>
  <d>
    <r ref=“c2;r4.jpg”/>
  </d>
</a>
```

In the case where the merged file is moved to a directory y in the manner described above with reference to FIG. 5, it will be seen that the contexts c1 and c2 require rewriting using the “../x” operator. However c1a and c1b remain unchanged as they are relative to c1:

```
<?xml version=“1.0” encoding=“UTF-8”?>
<a>
  <contexts>
    <context name=“c1”>../x/d1/x.xml</context>
    <context name=“c1a”>c1;e1/x.xml</context>
    <context name=“c1b”>c1;e2/x.xml</context>
    <context name=“c2”>../x/d2/x.xml</context>
      (32)
  </contexts>
  <b>
    <r ref=“c1a;r1.jpg”/>
    <r ref=“c1b;r5.jpg”/>
    <r ref=“c2;r3.jpg”/>
  </b>
  <c>
    <r ref=“c1a;r2.jpg”/>
    <r ref=“c1b;r6.jpg”/>
  </c>
  <d>
    <r ref=“c2;r4.jpg”/>
  </d>
</a>
```

However it will be appreciated that a mechanism may be incorporated for distinguishing nested contexts, for example c1a, c1b as against primary contexts, c1, c2 in order that automated adjustment of the context map can be introduced. One manner of doing this is to incorporate the cref identifier described in more detail above.

In this case, the corresponding steps can be expressed using the cref identifier. The original f1 document including nested contexts is expressed as:

```
<a xmlns:cref=“http://hp.com/hpl/dpp/cref”>                    (33)
  <cref:context-map>
    <cref:context name=“c1”>d1/x.xml</cref:context>
    <cref:context name=“c1a”>cref://c1/e1/x.xml</cref:context>
    <cref:context name=“c1b”>cref://c1/e2/x.xml</cref:context>
  </cref:context-map>
  <b>
    <r ref=“cref://c1a/r1.jpg”/>
    <r ref=“cref://c1b/r5.jpg”/>
  </b>
  <c>
    <r ref=“cref://c1a/r2.jpg”/>
    <r ref=“cref://c1b/r6.jpg”/>
  </c>
</a>
```

and the original document f2 is expressed as:

```
<a xmlns:cref=“http://hp.com/hpl/dpp/cref”>                    (34)
  <cref:context-map>
    <cref:context name=“c2”>d2/x.xml</cref:context>
  </cref:context-map>
  <b>
    <r ref=“cref://c2/r3.jpg”/>
  </b>
  </d>
    <r ref=“cref://c2/r4.jpg”/>
  </d>
</a>
```

When the documents are merged this is expressed as:

```
<?xml version=“1.0” encoding=“UTF-8”?>                    (35)
<a xmlns:cref=“http://hp.com/hpl/dpp/cref”>
  <cref:context-map>
    <cref:context name=“c1”>d1/x.xml</cref:context>
    <cref:context name=“c1a”>cref://c1/e1/x.xml</cref:context>
    <cref:context name=“c1b”>cref://c1/e2/x.xml</cref:context>
    <cref:context name=“c2”>d2/x.xml</cref:context>
  </cref:context-map>
  <b>
    <r ref=“cref://c1a/r1.jpg”/>
    <r ref=“cref://c1b/r5.jpg”/>
    <r ref=“cref://c2/r3.jpg”/>
  </b>
  <c>
    <r ref=“cref://c1a/r2.jpg”/>
    <r ref=“cref://c1b/r6.jpg”/>
  </c>
  <d>
    <r ref=“cref://c2/r4.jpg”/>
  </d>
</a>
```

Accordingly, moving the merged document to directory y gives:

```
<?xml version=“1.0” encoding=“UTF-8”?>                    (36)
<a xmlns:cref=“http://hp.com/hpl/dpp/cref”>
  <cref:context-map>
    <cref:context name=“c1”>../x/d1/x.xml</cref:context>
    <cref:context name=“c1a”>cref://c1/e1/x.xml</cref:context>
    <cref:context name=“c1b”>cref://c1/e2/x.xml</cref:context>
    <cref:context name=“c2”>../x/d2/x.xml</cref:context>
  </cref:context-map>
  <b>
    <r ref=“cref://c1a/r1.jpg”/>
    <r ref=“cref://c1b/r5.jpg”/>
```

-continued

```
    <r ref="cref://c2/r3.jpg"/>
  </b>
  <c>
    <r ref="cref://c1a/r2.jpg"/>
    <r ref="cref://c1b/r6.jpg"/>
  </c>
  <d>
    <r ref="cref://c2/r4.jpg"/>
  </d>
</a>
```

Again, the nested contexts c1a, c1b are not adjusted as they are defined relative to context c1. Because the syntax of absolute URL's is used, together with the URL scheme name cref://, machine transformation of listing (35) can be applied without requiring special rules for the nested context c1a, c1b. In particular it will be seen that whilst a context c1 is rewritten using the ../x operator, the context for c1a and c1b remains unchanged because of the machine recognition of the URL scheme name cref://.

Reverting to the nested context example described above with reference to FIG. 9 and listing (32), it will be seen that the remaining transformations described above with reference to FIGS. 6, 7 and 8, that is to say, transferring the contents of x/d1 to y/d3, further transferring the contents of x/d2 to y/d3, and finally transferring r1 and r2 from y/d3 to y/d4 can be implemented using the nested context approach in an analogous manner to that set out in listing (25) to listing (27), and in particular adjusting the primary context c1, c2 as appropriate whilst leaving the nested contexts c1a, c1b unchanged. As a result the listings will not be provided here in detail as they will be apparent to the skilled reader.

It will further be appreciated that nested contexts may individually be moved whilst still preserving their identity. For example where nested context c1a is moved, following the transformation described above with reference to FIGS. 4 to 8, from sub-folder e1 of d4 in y to a new sub-folder e3 of d4 in y such that, for example, resource r1 is moved from y/d4/e1/r1.jpg to y/d4/e3/r1.jpg and resource r2 is moved similarly, then it is simply necessary to rewrite the entry for c1a in the context map as shown below:

```
<?xml version="1.0" encoding="UTF-8"?>                    (37)
<a>
  <contexts>
    <context name="c1">d4/x.xml</context>
    <context name="c1a">c1;e3/x.xml</context>
    <context name="c1b">c1;e2/x.xml</context>
    <context name="c2">d3/x.xml</context>
  </contexts>
  <b>
    <r ref="c1a;r1.jpg"/>
    <r ref="c1b;r5.jpg"/>
    <r ref="c2;r3.jpg"/>
  </b>
  <c>
    <r ref="c1a;r2.jpg"/>
    <r ref="c1b;r6.jpg"/>
  </c>
  <d>
    <r ref="c2;r4.jpg"/>
  </d>
</a>
```

In this case it will be seen that although context c1a has moved it is still relative to c1 and so will follow the moves of c1.

Alternatively a nested context can be dissociated from its primary context. For example if context c1b, i.e. resources r5 and r6, are moved from y/d4/e2 to a new directory y/d5 then:

```
<?xml version="1.0" encoding="UTF-8"?>                    (38)
<a>
  <contexts>
    <context name="c1">d4/x.xml</context>
    <context name="c1a">c1;e3/x.xml</context>
    <context name="c1b">d5/x.xml</context>
    <context name="c2">d3/x.xml</context>
  </contexts>
  <b>
    <r ref="c1a;r1.jpg"/>
    <r ref="c1b;r5.jpg"/>
    <r ref="c2;r3.jpg"/>
  </b>
  <c>
    <r ref="c1a;r2.jpg"/>
    <r ref="c1b;r6.jpg"/>
  </c>
  <d>
    <r ref="c2;r4.jpg"/>
  </d>
</a>
```

In that case it can be seen that context c1b is no longer relative to c1 such that if c1 moves again, c1b does not follow.

Accordingly it can be seen that nested contexts provide an additional level of flexibility but also of association of resources, further embracing the possibility of associating nested contexts such that they effectively form independent primary contexts.

In the case of movement of c1a to y/d4/e3 as set out in listing (37), using the cref notation approach gives:

```
<?xml version="1.0" encoding="UTF-8"?>                    (39)
<a xmlns:cref="http://hp.com/hpl/dpp/cref">
  <cref:context-map>
    <cref:context name="c1">d4/x.xml</cref:context>
    <cref:context name="c1a">cref://c1/e3/x.xml</cref:context>
    <cref:context name="c1b">cref://c1/e2/x.xml</cref:context>
    <cref:context name="c2">d3/x.xml</cref:context>
  </cref:context-map>
  <b>
    <r ref="cref://c1a/r1.jpg"/>
    <r ref="cref://c1b/r5.jpg"/>
    <r ref="cref://c2/r3.jpg"/>
  </b>
  <c>
    <r ref="cref://c1a/r2.jpg"/>
    <r ref="cref://c1b/r6.jpg"/>
  </c>
  <d>
    <r ref="cref://c2/r4.jpg"/>
  </d>
</a>
```

Where context c1b is transferred to y/d5 and effectively dissociated from context c1 as set out in listing (38), then in the cref notation we have:

```
<?xml version="1.0" encoding="UTF-8"?>                    (40)
<a xmlns:cref="http://hp.com/hpl/dpp/cref">
  <cref:context-map>
    <cref:context name="c1">d4/x.xml</cref:context>
    <cref:context name="c1a">cref://c1/e3/x.xml</cref:context>
    <cref:context name="c1b">d5/x.xml</cref:context>
    <cref:context name="c2">d3/x.xml</cref:context>
```

-continued

```
  </cref:context-map>
  <b>
    <r ref="cref://c1a/r1.jpg"/>
    <r ref="cref://c1b/r5.jpg"/>
    <r ref="cref://c2/r3.jpg"/>
  </b>
  <c>
    <r ref="cref://c1a/r2.jpg"/>
    <r ref="cref://c1b/r6.jpg"/>
  </c>
  <d>
    <r ref="cref://c2/r4.jpg"/>
  </d>
</a>
```

It can be seen that, accordingly, context c1b is no longer treated as a nested context, but resolved as a primary context following standard resolution rules thereafter, and the operation is simplified by use of the cref notation.

Figure 10:
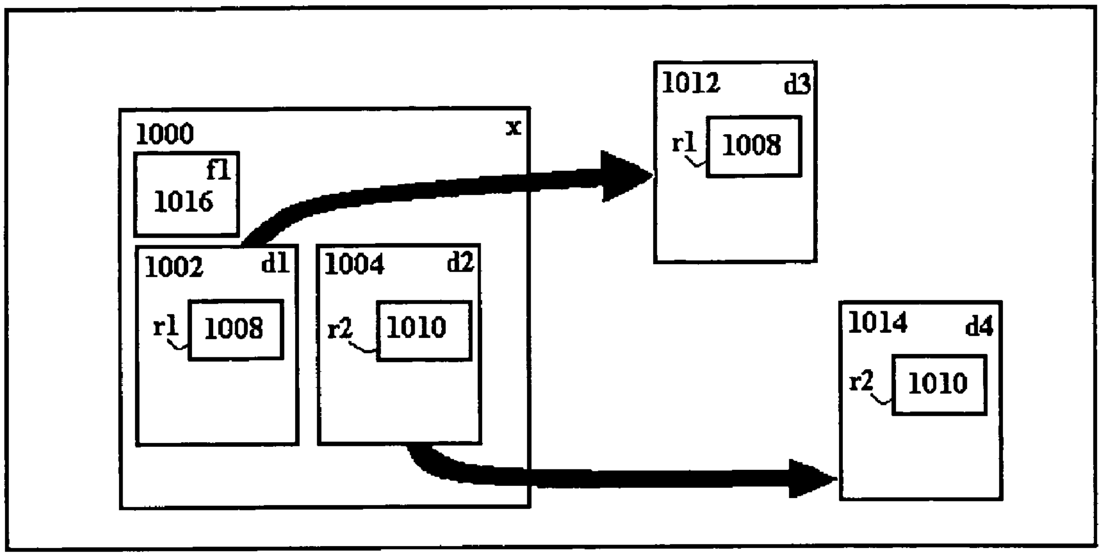
FIG. 10 shows a file architecture in which contexts are identified by discardable path elements.

It will further be seen that, according to an additional embodiment, advantage can be taken of the resource identifier resolution approach described above. In particular it will be noted that the base element or identifier in the context map includes an identifier path element and a discardable path element. For example where the context name for c1 maps to d1/x.xml and the c1 reference is c1; r1.jpg then this resolves to d1/r1.jpg. In other words the component d1 is used and the component x.xml is discarded. As a result, it is possible to incorporate additional information into this component and use it as a context identifier. For example, referring to the file architecture shown in FIG. 10 where a similar scheme to that of FIGS. 4 to 8 is shown for clarity of explanation, a directory x, reference numeral 1000 includes sub-directories d1, reference 1002, and d2, reference 1004. Each of these includes a respective resource r1, r2, references numerals 1008, 1010 respectively. In the case where r1 and r2 are allocated to context c1 and c2 respectively then a document f1, reference numeral 1016 in x is expressed, using a naming context map, as:

(41)

```
<a>
  <contexts>
    <context name="c1">d1/x.xml</context>
    <context name="c2">d2/x.xml</context>
  </contexts>
  <b>
    <r ref="c1;r1.jpg"/>
  </b>
  <c>
    <r ref="c2;r2.jpg"/>
  </c>
</a>
```

It can be seen, therefore, that r1, r2 resolve to d1/r1.jpg, d2/r2.jpg.

In the case that r1 is moved to a remote directory d3 and r2 is moved to a remote directory d4, reference numeral 1012, 1014 respectively then it will be seen that the document can be represented by:

(42)

```
<a>
  <contexts>
    <context name="c1">..d3/x.xml</context>
    <context name="c2">../d4/x.xml</context>
  </contexts>
```

-continued

```
  <b>
    <r ref="c1;r1.jpg"/>
  </b>
  <c>
    <r ref="c2;r2.jpg"/>
  </c>
```

As the context names c1, c2 are purely internal to the document and carry no external meaning, additional information can be encoded into the discardable part of the base URI to simplify operation. For example where x/d1 stores corporate images such as a logo r1 and x/d2 stores supplier images for example a product picture r2 then the discardable part of each URI x.xml can be replaced, for example, by "corporate" and "supplier" respectively such that listing (41) becomes:

(43)

```
<a>
  <contexts>
    <context name="c1">d1/corporate</context>
    <context name="c2">d2/supplier</context>
  </contexts>
  <b>
    <r ref="c1;r1.jpg"/>
  </b>
  <c>
    <r ref="c2;r2.jpg"/>
  </c>
  <d>
</a>
```

In this case the references still resolve to d1/r1.jpg and d2/r2.jpg. It may be desirable to change the locations of the sets of images for example when shipping a document to an external print shop that has various clients who use a common set of suppliers, especially if the print shop maintains its own image repository. For example with reference once again to FIG. 10 directories d3 and d4 may be for client and shared resources respectively. In this case, renaming the context entries in listing (43) above provides:

(44)

```
<a>
  <contexts>
    <context name="c1">../d3/corporate</con-
text>
    <context name="c2">../d4/shared</context>
  </contexts>
  <b>
    <r ref="c1;r1.jpg"/>
  </b>
  <c>
    <r ref="c2;r2.jpg"/>
  </c>
</a>
```

No change is required to the references themselves, as described above, which again resolve to d3/r1.jpg and d4/r2.jpg.

As a result of this approach, machine implemented renaming can be carried out by a simple search for the relevant discardable path element in the context map. For example an instruction "relocate all corporate images in d3" can be easily implemented by searching for a base identifier including the discardable element "corporate". The identifier path element is then updated appropriately and the discardable element reattached. Accordingly useful additional information concerning the nature of the images can be added and maintained in addition to the context name itself which can be assigned using any appropriate consistent strategy.

It will be appreciated that any part of the base URI in the context map that will be discarded may be used as the label. For example, as described in Section A below, a fragment identifier may be used as the discardable element as it will be preserved only if the relative URI is completely empty. Alternatively according to the scheme described below in Section B, the final path element, parameters, query string and fragment id are all discarded such that any may serve as a label.

As a result sets of resources can be independently managed using a discardable part of a base URI as a label linking the URI to the set of resources for which it is the base. Thus the set of resources can be altered independently of the other sets of resources even if the resources have been put at the same location.

It will be appreciated that the methods and approaches described above can be implemented in any appropriate manner in hardware, firmware or software and that relevant instructions can be stored on a computer readable medium and implemented by a processor to put the method into effect. The method step set out can be carried out in any appropriate order and aspects from the examples and embodiments described juxtaposed or interchanged as appropriate.

Section A

A Uniform Resource Locator (URL) is a compact representation of the location and access method for a resource available via the Internet. When embedded within a base document, a URL in its absolute form may contain a great deal of information which is already known from the context of that base document's retrieval, including the scheme, network location, and parts of the url-path. In situations where the base URL is well-defined and known to the parser (human or machine), it is useful to be able to embed URL references which inherit that context rather than re-specifying it in every instance. This section defines the syntax and semantics for such Relative Uniform Resource Locators.

This section describes the syntax and semantics for "relative" Uniform Resource Locators (relative URLs): a compact representation of the location of a resource relative to an absolute base URL. It is a companion to RFC 1738, "Uniform Resource Locators (URL)", which specifies the syntax and semantics of absolute URLs.

A common use for Uniform Resource Locators is to embed them within a document (referred to as the "base" document) for the purpose of identifying other Internet-accessible resources. For example, in hypertext documents, URLs can be used as the identifiers for hypertext link destinations.

Absolute URLs contain a great deal of information which may already be known from the context of the base document's retrieval, including the scheme, network location, and parts of the URL path. In situations where the base URL is well-defined and known, it is useful to be able to embed a URL reference which inherits that context rather than re-specifying it within each instance. Relative URLs can also be used within data-entry dialogs to decrease the number of characters necessary to describe a location.

In addition, it is often the case that a group or "tree" of documents has been constructed to serve a common purpose; the vast majority of URLs in these documents point to locations within the tree rather than outside of it. Similarly, documents located at a particular Internet site are much more likely to refer to other resources at that site than to resources at remote sites.

Relative addressing of URLs allows document trees to be partially independent of their location and access scheme. For instance, it is possible for a single set of hypertext documents to be simultaneously accessible and traversable via each of the "file", "http", and "ftp" schemes if the documents refer to each other using relative URLs. Furthermore, document trees can be moved, as a whole, without changing any of the embedded URLs. Experience within the World-Wide Web has demonstrated that the ability to perform relative referencing is necessary for the long-term usability of embedded URLs.

The syntax for relative URLs is a shortened form of that for absolute URLs, where some prefix of the URL is missing and certain path components ("." and "..") have a special meaning when interpreting a relative path. Because a relative URL may appear in any context that could hold an absolute URL, systems that support relative URLs must be able to recognize them as part of the URL parsing process.

Although this section does not seek to define the overall URL syntax, some discussion of it is necessary in order to describe the parsing of relative URLs. In particular, base documents can only make use of relative URLs when their base URL fits within the generic-RL syntax described below. Although some URL schemes do not require this generic-RL syntax, it is assumed that any document which contains a relative reference does have a base URL that obeys the syntax. In other words, relative URLs cannot be used within documents that have unsuitable base URLs.

The URL syntax is dependent upon the scheme. Some schemes use reserved characters like "?" and ";" to indicate special components, while others just consider them to be part of the path. However, there is enough uniformity in the use of URLs to allow a parser to resolve relative URLs based upon a single, generic-RL syntax. This generic-RL syntax consists of six components:

<scheme>://<net_loc>/<path>;<params>?<query>#<fragment> each of which, except <scheme>, may be absent from a particular URL. These components are defined as follows:

| | |
|---|---|
| scheme ":" ::= | scheme name, as per Section 2.1 of RFC 1738 [2]. |
| "//" net_loc ::= | network location and login information, as per Section 3.1 of RFC 1738 [2]. |
| "/" path ::= | URL path, as per Section 3.1 of RFC 1738 [2]. |
| ";" params ::= | object parameters (e.g., ";type=a" as in Section 3.2.2 of RFC 1738 [2]). |
| "?" query ::= | query information, as per Section 3.3 of RFC 1738 [2]. |
| "#" fragment ::= | fragment identifier. |

Note that the fragment identifier (and the "#" that precedes it) is not considered part of the URL. However, since it is commonly used within the same string context as a URL, a parser must be able to recognize the fragment when it is present and set it aside as part of the parsing process.

The order of the components is important. If both <params> and <query> are present, the <query> information must occur after the <params>.

This is a BNF-like description of the Relative Uniform Resource Locator syntax, using the conventions of RFC 822, except that "|" is used to designate alternatives. Briefly, literals are quoted with " ", parentheses "(" and ")" are used to group elements, optional elements are enclosed in [brackets], and elements may be preceded with <n>* to designate n or more repetitions of the following element; n defaults to 0.

This BNF also describes the generic-RL syntax for valid base URLs. Note that this differs from the URL syntax defined in RFC 1738 in that all schemes are required to use a single set of reserved characters and use them consistently within the major URL components.

```
URL =            ( absoluteURL | relativeURL ) [ "#" fragment ]
absoluteURL =    generic-RL | ( scheme ":" *( uchar|reserved))
generic-RL =     scheme ":" relativeURL
relativeURL =    net_path | abs_path | rel_path
net_path =       "//" net_loc [ abs_path ]
abs_path =       "/" rel_path
rel_path =       [ path ] [ ";" params ] [ "?" query ]
path =           fsegment *( "/" segment )
fsegment =       1*pchar
segment =        *pchar
params =         param *( ";" param )
param =          *( pchar | "/" )
scheme =         1*( alpha | digit | "+" | "-" | "." )
net_loc =          *( pchar | ";" | "?" )
query =            *( uchar | reserved )
fragment =         *( uchar | reserved )
pchar =          uchar | ":" | "@" | "&" | "="
uchar =          unreserved | escape
unreserved =     alpha | digit | safe | extra
escape =         "%" hex hex
hex =            digit | "A" | "B" | "C" | "D" | "E" | "F" |
                        "a" | "b" | "c" | "d" | "e" | "f"
alpha =          lowalpha | hialpha
lowalpha =       "a" | "b" | "c" | "d" | "e" | "f" | "g" | "h" | "i" |
                 "j" | "k" | "l" | "m" | "n" | "o" | "p" | "q" | "r" |
                 "s" | "t" | "u" | "v" | "w" | "x" | "y" | "z"
hialpha =        "A" | "B" | "C" | "D" | "E" | "F" | "G" | "H" | "I" |
                 "J" | "K" | "L" | "M" | "N" | "O" | "P" | "Q" | "R" |
                 "S" | "T" | "U" | "V" | "W" | "X" | "Y" | "Z"
digit =          0" | "1" | "2" | "3" | "4" | "5" | "6" | "7" |
                 "8" | "9"
safe =           "$" | "-" | "_" | "." | "+"
extra =          "!" | "*" | "'" | "(" | ")" | ","
national =       "{" | "}" | "|" | "\" | "^" | "~" | "[" | "]" | "`"
reserved =       ";" | "/" | "?" | ":" | "@" | "&" | "="
punctuation =    "<" | ">" | "#" | "%" | <">
```

Each URL scheme has its own rules regarding the presence or absence of the syntactic components described. In addition, some schemes are never appropriate for use with relative URLs. However, since relative URLs will only be used within contexts in which they are useful, these scheme-specific differences can be ignored by the resolution process.

Within this section, we include as examples only those schemes that have a defined URL syntax in RFC 1738. The following schemes are never used with relative URLs:

| | |
|---|---|
| mailto | Electronic Mail |
| news | USENET news |
| telnet | TELNET Protocol for Interactive Sessions |

Some URL schemes allow the use of reserved characters for purposes outside the generic-RL syntax given above. However, such use is rare. Relative URLs can be used with these schemes whenever the applicable base URL follows the generic-RL syntax.

| | |
|---|---|
| gopher | Gopher and Gopher+ Protocols |
| prospero | Prospero Directory Service |
| wais | Wide Area Information Servers Protocol |

Users of gopher URLs should note that gopher-type information is almost always included at the beginning of what would be the generic-RL path. If present, this type information prevents relative-path references to documents with differing gopher-types.

Finally, the following schemes can always be parsed using the generic-RL syntax. This does not necessarily imply that relative URLs will be useful with these schemes—that decision is left to the system implementation and the author of the base document.

| | |
|---|---|
| file | Host-specific Files |
| ftp | File Transfer Protocol |
| http | Hypertext Transfer Protocol |
| nntp | USENET news using NNTP access |

Section 5 of RFC 1738 specifies that the question-mark character ("?") is allowed in an ftp or file path segment. However, this is not true in practice and is believed to be an error in the RFC. Similarly, RFC 1738 allows the reserved character semicolon (";") within an http path segment, but does not define its semantics; the correct semantics are as defined by this section for <params>.

We recommend that new schemes be designed to be parsable via the generic-RL syntax if they are intended to be used with relative URLs. A description of the allowed relative forms should be included when a new scheme is registered, as per Section 4 of RFC 1738.

An accepted method for parsing URLs is useful to clarify the generic-RL syntax and to describe the algorithm for resolving relative URLs presented. This section describes the parsing rules for breaking down a URL (relative or absolute) into the component parts described below. The rules assume that the URL has already been separated from any surrounding text and copied to a "parse string". The rules are listed in the order in which they would be applied by the parser.

If the parse string contains a crosshatch "#" character, then the substring after the first (left-most) crosshatch "#" and up to the end of the parse string is the <fragment> identifier. If the crosshatch is the last character, or no crosshatch is present, then the fragment identifier is empty. The matched substring, including the crosshatch character, is removed from the parse string before continuing.

Note that the fragment identifier is not considered part of the URL. However, since it is often attached to the URL, parsers must be able to recognize and set aside fragment identifiers as part of the process.

If the parse string contains a colon ":" after the first character and before any characters not allowed as part of a scheme name (i.e., any not an alphanumeric, plus "+", period ".", or hyphen "-"), the <scheme> of the URL is the substring of characters up to but not including the first colon. These characters and the colon are then removed from the parse string before continuing.

If the parse string begins with a double-slash "//", then the substring of characters after the double-slash and up to, but not including, the next slash "/" character is the network location/login (<net_loc>) of the URL. If no trailing slash "/" is present, the entire remaining parse string is assigned to <net_loc>. The double-slash and <net_loc> are removed from the parse string before continuing.

If the parse string contains a question mark "?" character, then the substring after the first (left-most) question mark "?" and up to the end of the parse string is the <query> information. If the question mark is the last character, or no question mark is present, then the query information is empty. The matched substring, including the question mark character, is removed from the parse string before continuing.

If the parse string contains a semicolon ";" character, then the substring after the first (left-most) semicolon ";" and up to the end of the parse string is the parameters (<params>). If the semicolon is the last character, or no semicolon is present, then <params> is empty. The matched substring, including the semicolon character, is removed from the parse string before continuing.

After the above steps, all that is left of the parse string is the URL <path> and the slash "/" that may precede it. Even though the initial slash is not part of the URL path, the parser must remember whether or not it was present so that later processes can differentiate between relative and absolute paths. Often this is done by simply storing the preceding slash along with the path.

The term "relative URL" implies that there exists some absolute "base URL" against which the relative reference is applied. Indeed, the base URL is necessary to define the semantics of any embedded relative URLs; without it, a relative reference is meaningless. In order for relative URLs to be usable within a document, the base URL of that document must be known to the parser.

The base URL of a document can be established in one of four ways, listed below in order of precedence. The order of precedence can be thought of in terms of layers, where the innermost defined base URL has the highest precedence. This can be visualized as follows:

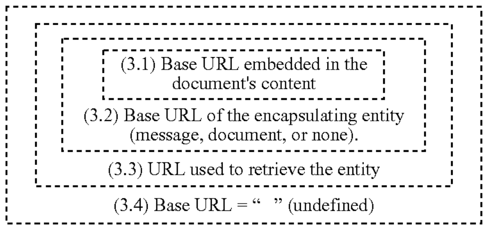

Within certain document media types, the base URL of the document can be embedded within the content itself such that it can be readily obtained by a parser. This can be useful for descriptive documents, such as tables of content, which may be transmitted to others through protocols other than their usual retrieval context (e.g., E-Mail or USENET news).

It is beyond the scope of this section to specify how, for each media type, the base URL can be embedded. User agents manipulating such media types may be able to obtain the appropriate syntax from that media type's specification.

Messages are considered to be composite documents. The base URL of a message can be specified within the message headers (or equivalent tagged metainformation) of the message. For protocols that make use of message headers like those described in RFC 822 [5], we recommend that the format of this header maybe:

base-header="Base" ":" "<URL:" absoluteURL ">"

where "Base" is case-insensitive and any whitespace (including that used for line folding) inside the angle brackets is ignored. For example, the header field Base: <URL:http://www.ics.uci.edu/Test/a/b/c> would indicate that the base URL for that message is the string "http://www.ics.uci.edu/Test/a/b/c". The base URL for a message serves as both the base for any relative URLs within the message headers and the default base URL for documents enclosed within the message, as described in the next section.

Protocols which do not use the RFC 822 message header syntax, but which do allow some form of tagged metainformation to be included within messages, may define their own syntax for defining the base URL as part of a message.

If no base URL is embedded, the base URL of a document is defined by the document's retrieval context. For a document that is enclosed within another entity (such as a message or another document), the retrieval context is that entity; thus, the default base URL of the document is the base URL of the entity in which the document is encapsulated.

Composite media types, such as the "multipart/*" and "message/*" media types defined by MIME (RFC 1521), define a hierarchy of retrieval context for their enclosed documents. In other words, the retrieval context of a component part is the base URL of the composite entity of which it is a part. Thus, a composite entity can redefine the retrieval context of its component parts via the inclusion of a base-header, and this redefinition applies recursively for a hierarchy of composite parts. Note that this might not change the base URL of the components, since each component may include an embedded base URL or base-header that takes precedence over the retrieval context.

If no base URL is embedded and the document is not encapsulated within some other entity (e.g., the top level of a composite entity), then, if a URL was used to retrieve the base document, that URL shall be considered the base URL. Note that if the retrieval was the result of a redirected request, the last URL used (i.e., that which resulted in the actual retrieval of the document) is the base URL.

If none of the conditions described below apply, then the base URL is considered to be the empty string and all embedded URLs within that document are assumed to be absolute URLs.

It is the responsibility of the distributor(s) of a document containing relative URLs to ensure that the base URL for that document can be established. It must be emphasized that relative URLs cannot be used reliably in situations where the document's base URL is not well-defined.

This section describes an example algorithm for resolving URLs within a context in which the URLs may be relative, such that the result is always a URL in absolute form. Although this algorithm may not guarantee that the resulting URL will equal that intended by the original author, it does provide that any valid URL (relative or absolute) can be consistently transformed to an absolute form given a valid base URL.

The following steps are performed in order:

Step 1: The base URL is established according to the rules of Section 3. If the base URL is the empty string (unknown), the embedded URL is interpreted as an absolute URL and we are done.

Step 2: Both the base and embedded URLs are parsed into their component parts as described in Section 2.4.

a) If the embedded URL is entirely empty, it inherits the entire base URL (i.e., is set equal to the base URL) and we are done.

b) If the embedded URL starts with a scheme name, it is interpreted as an absolute URL and we are done.

c) Otherwise, the embedded URL inherits the scheme of the base URL.

Step 3: If the embedded URL's <net_loc> is non-empty, we skip to Step 7. Otherwise, the embedded URL inherits the <net_loc> (if any) of the base URL.

Step 4: If the embedded URL path is preceded by a slash "/", the path is not relative and we skip to Step 7.

Step 5: If the embedded URL path is empty (and not preceded by a slash), then the embedded URL inherits the base URL path, and a) if the embedded URL's <params> is non-empty, we skip to step 7; otherwise, it inherits the <params> of the base URL (if any) and b) if the embedded URL's <query> is non-empty, we skip to step 7; otherwise, it inherits the <query> of the base URL (if any) and we skip to step 7.

Step 6: The last segment of the base URL's path (anything following the rightmost slash "/", or the entire path if no slash is present) is removed and the embedded URL's path is appended in its place. The following operations are then applied, in order, to the new path:

a) All occurrences of "./", where "." is a complete path segment, are removed.

b) If the path ends with "." as a complete path segment, that "." is removed.

c) All occurrences of "<segment>/../", where <segment> is a complete path segment not equal to ".." are removed. Removal of these path segments is performed iteratively, removing the leftmost matching pattern on each iteration, until no matching pattern remains.

d) If the path ends with "<segment>/..", where <segment> is a complete path segment not equal to "..", that "<segment>/.." is removed.

Step 7: The resulting URL components, including any inherited from the base URL, are recombined to give the absolute form of the embedded URL.

Parameters, regardless of their purpose, do not form a part of the URL path and thus do not affect the resolving of relative paths. In particular, the presence or absence of the ";type=d" parameter on an ftp URL does not affect the interpretation of paths relative to that URL. Fragment identifiers are only inherited from the base URL when the entire embedded URL is empty.

The above algorithm is intended to provide an example by which the output of implementations can be tested—implementation of the algorithm itself is not required. For example, some systems may find it more efficient to implement Step 6 as a pair of segment stacks being merged, rather than as a series of string pattern matches.

Within an object with a well-defined base URL of

Base: <URL:http://a/b/c/d; p?q#f> the relative URLs would be resolved as follows:

| | |
|---|---|
| g:h = | <URL:g:h> |
| g = | <URL:http://a/b/c/g> |
| ./g = | <URL:http://a/b/c/g> |
| g/ = | <URL:http://a/b/c/g/> |
| /g = | <URL:http://a/g> |
| //g = | <URL:http://g> |
| ?y = | <URL:http://a/b/c/d;p?y> |
| g?y = | <URL:http://a/b/c/g?y> |
| g?y/./x = | <URL:http://a/b/c/g?y/./x> |
| #s = | <URL:http://a/b/c/d;p?q#s> |
| g#s = | <URL:http://a/b/c/g#s> |
| g#s/./x = | <URL:http://a/b/c/g#s/./x> |
| g?y#s = | <URL:http://a/b/c/g?y#s> |
| ;x = | <URL:http://a/b/c/d;x> |
| g;x = | <URL:http://a/b/c/g;x> |
| g;x?y#s = | <URL:http://a/b/c/g;x?y#s> |
| . = | <URL:http://a/b/c/> |
| ./ = | <URL:http://a/b/c/> |
| .. = | <URL:http://a/b/> |
| ../ = | <URL:http://a/b/> |
| ../g = | <URL:http://a/b/g> |

-continued

| | |
|---|---|
| ../.. = | <URL:http://a/> |
| ../../ = | <URL:http://a/> |
| ../../g = | <URL:http://a/g> |

Although the following abnormal examples are unlikely to occur in normal practice, all URL parsers should be capable of resolving them consistently. Each example uses the same base as above.

An empty reference resolves to the complete base URL: < >=<URL:http://a/b/c/d; p?q#f>

Parsers must be careful in handling the case where there are more relative path ".." segments than there are hierarchical levels in the base URL's path. Note that the ".." syntax cannot be used to change the <net_loc> of a URL.

| | |
|---|---|
| ../../../g = | <URL:http://a/../g> |
| ../../../../g = | <URL:http://a/../../g> |

Similarly, parsers must avoid treating "." and ".." as special when they are not complete components of a relative path.

| | |
|---|---|
| /./g = | <URL:http://a/./g> |
| /../g = | <URL:http://a/../g> |
| g. = | <URL:http://a/b/c/g.> |
| .g = | <URL:http://a/b/c/.g> |
| g.. = | <URL:http://a/b/c/g..> |
| ..g = | <URL:http://a/b/c/..g> |

Less likely are cases where the relative URL uses unnecessary or nonsensical forms of the "." and ".." complete path segments.

| | |
|---|---|
| ./../g = | <URL:http://a/b/g> |
| ./g/. = | <URL:http://a/b/c/g/> |
| g/./h = | <URL:http://a/b/c/g/h> |
| g/../h = | <URL:http://a/b/c/h> |

Finally, some older parsers allow the scheme name to be present in a relative URL if it is the same as the base URL scheme. This is considered to be a loophole in prior specifications of partial URLs [1] and should be avoided by future parsers.

| | |
|---|---|
| http:g = | <URL:http:g> |
| http: = | <URL:http:> |

Authors should be aware that path names which contain a colon ":" character cannot be used as the first component of a relative URL path (e.g., "this:that") because they will likely be mistaken for a scheme name. It is therefore recommended to precede such cases with other components (e.g., "./this:that"), or to escape the colon character (e.g., "this %3Athat"), in order for them to be correctly parsed. The former solution may be preferred because it does not affect the absolute form of the URL.

There is an ambiguity in the semantics for the ftp URL scheme regarding the use of a trailing slash ("/") character and/or a parameter ";type=d" to indicate a resource that is an ftp directory. If the result of retrieving that directory includes embedded relative URLs, it is necessary that the base URL path for that result include a trailing slash. For this reason, we recommend that the ";type=d" parameter value not be used within contexts that allow relative URLs.

There are no security considerations in the use or parsing of relative URLs. However, once a relative URL has been resolved to its absolute form, the same security considerations apply as those described in RFC 1738.

This work is draws from concepts introduced by Tim Berners-Lee and the World-Wide Web global information initiative. Relative URLs are described as "Partial URLs" in RFC 1630. That description was expanded for inclusion as an appendix for an early draft of RFC 1738, "Uniform Resource Locators (URL)". However, after further discussion, the URI-WG decided to specify Relative URLs separately from the primary URL draft.

This section is intended to fulfill the recommendations for Internet Resource Locators. It has benefited greatly from the comments of all those participating in the URI-WG.

Section B

Uniform Resource Identifiers (URI) provide a simple and extensible means for identifying a resource. This specification of URI syntax and semantics is derived from concepts introduced by the World Wide Web global information initiative, whose use of such objects dates from 1990 and is described in "Universal Resource Identifiers in WWW" [RFC1630]. The specification of URI is designed to meet the recommendations laid out in "Functional Recommendations for Internet Resource Locators" [RFC1736] and "Functional Requirements for Uniform Resource Names" [RFC1737].

This section updates and merges "Uniform Resource Locators" [RFC1738] and "Relative Uniform Resource Locators" [RFC1808] in order to define a single, generic syntax for all URI. It excludes those portions of RFC 1738 that defined the specific syntax of individual URL schemes; those portions will be updated as separate documents, as will the process for registration of new URI schemes. This document does not discuss the issues and recommendation for dealing with characters outside of the US-ASCII character set [ASCII]; those recommendations are discussed in a separate document.

URI are characterized by the following definitions:

Uniform—Uniformity provides several benefits: it allows different types of resource identifiers to be used in the same context, even when the mechanisms used to access those resources may differ; it allows uniform semantic interpretation of common syntactic conventions across different types of resource identifiers; it allows introduction of new types of resource identifiers without interfering with the way that existing identifiers are used; and, it allows the identifiers to be reused in many different contexts, thus permitting new applications or protocols to leverage a pre-existing, large, and widely-used set of resource identifiers.

Resource—A resource can be anything that has identity. Familiar examples include an electronic document, an image, a service (e.g., "today's weather report for Los Angeles"), and a collection of other resources. Not all resources are network "retrievable"; e.g., human beings, corporations, and bound books in a library can also be considered resources.

The resource is the conceptual mapping to an entity or set of entities, not necessarily the entity which corresponds to that mapping at any particular instance in time. Thus, a resource can remain constant even when its content—the entities to which it currently corresponds—changes over time, provided that the conceptual mapping is not changed in the process.

Identifier—An identifier is an object that can act as a reference to something that has identity. In the case of URI, the object is a sequence of characters with a restricted syntax.

Having identified a resource, a system may perform a variety of operations on the resource, as might be characterized by such words as 'access', 'update', 'replace', or 'find attributes'.

A URI can be further classified as a locator, a name, or both. The term "Uniform Resource Locator" (URL) refers to the subset of URI that identify resources via a representation of their primary access mechanism (e.g., their network "location"), rather than identifying the resource by name or by some other attribute(s) of that resource. The term "Uniform Resource Name" (URN) refers to the subset of URI that are required to remain globally unique and persistent even when the resource ceases to exist or becomes unavailable.

The URI scheme defines the namespace of the URI, and thus may further restrict the syntax and semantics of identifiers using that scheme. This specification defines those elements of the URI syntax that are either required of all URI schemes or are common to many URI schemes. It thus defines the syntax and semantics that are needed to implement a scheme-independent parsing mechanism for URI references, such that the scheme-dependent handling of a URI can be postponed until the scheme-dependent semantics are needed. We use the term URL below when describing syntax or semantics that only apply to locators.

Although many URL schemes are named after protocols, this does not imply that the only way to access the URL's resource is via the named protocol. Gateways, proxies, caches, and name resolution services might be used to access some resources, independent of the protocol of their origin, and the resolution of some URL may require the use of more than one protocol (e.g., both DNS and HTTP are typically used to access an "http" URL's resource when it can't be found in a local cache).

A URN differs from a URL in that it's primary purpose is persistent labeling of a resource with an identifier. That identifier is drawn from one of a set of defined namespaces, each of which has its own set name structure and assignment procedures. The "urn" scheme has been reserved to establish the requirements for a standardized URN namespace, as defined in "URN Syntax" [RFC2141] and its related specifications.

Most of the examples in this specification demonstrate URL, since they allow the most varied use of the syntax and often have a hierarchical namespace. A parser of the URI syntax is capable of parsing both URL and URN references as a generic URI; once the scheme is determined, the scheme-specific parsing can be performed on the generic URI components. In other words, the URI syntax is a superset of the syntax of all URI schemes.

The following examples illustrate URI that are in common use.

```
ftp://ftp.is.co.za/rfc/rfc1808.txt
   -- ftp scheme for File Transfer Protocol services
gopher://spinaltap.micro.umn.edu/00/Weather/California/Los%20Angeles
   -- gopher scheme for Gopher and Gopher+ Protocol services
http://www.math.uio.no/faq/compression-faq/part1.html
   -- http scheme for Hypertext Transfer Protocol services
mailto:mduerst@ifi.unizh.ch
   -- mailto scheme for electronic mail addresses
news:comp.infosystems.www.servers.unix
   -- news scheme for USENET news groups and articles
telnet://melvyl.ucop.edu/
   -- telnet scheme for interactive services via the TELNET Protocol
```

An absolute identifier refers to a resource independent of the context in which the identifier is used. In contrast, a relative identifier refers to a resource by describing the difference within a hierarchical namespace between the current context and an absolute identifier of the resource.

Some URI schemes support a hierarchical naming system, where the hierarchy of the name is denoted by a “/” delimiter separating the components in the scheme. This document defines a scheme-independent ‘relative’ form of URI reference that can be used in conjunction with a ‘base’ URI (of a hierarchical scheme) to produce another URI. The syntax of hierarchical URI is described in Section 3; the relative URI calculation is described in Section 5.

The URI syntax was designed with global transcribability as one of its main concerns. A URI is a sequence of characters from a very limited set, i.e. the letters of the basic Latin alphabet, digits, and a few special characters. A URI may be represented in a variety of ways: e.g., ink on paper, pixels on a screen, or a sequence of octets in a coded character set. The interpretation of a URI depends only on the characters used and not how those characters are represented in a network protocol.

The goal of transcribability can be described by a simple scenario. Imagine two colleagues, Sam and Kim, sitting in a pub at an international conference and exchanging research ideas. Sam asks Kim for a location to get more information, so Kim writes the URI for the research site on a napkin. Upon returning home, Sam takes out the napkin and types the URI into a computer, which then retrieves the information to which Kim referred.

There are several design concerns revealed by the scenario:

A URI is a sequence of characters, which is not always represented as a sequence of octets.

A URI may be transcribed from a non-network source, and thus should consist of characters that are most likely to be able to be typed into a computer, within the constraints imposed by keyboards (and related input devices) across languages and locales.

A URI often needs to be remembered by people, and it is easier for people to remember a URI when it consists of meaningful components.

These design concerns are not always in alignment. For example, it is often the case that the most meaningful name for a URI component would require characters that cannot be typed into some systems. The ability to transcribe the resource identifier from one medium to another was considered more important than having its URI consist of the most meaningful of components. In local and regional contexts and with improving technology, users might benefit from being able to use a wider range of characters; such use is not defined in this document.

This document uses two conventions to describe and define the syntax for URI. The first, called the layout form, is a general description of the order of components and component separators, as in <first>/<second>;<third>?<fourth>

The component names are enclosed in angle-brackets and any characters outside angle-brackets are literal separators. Whitespace should be ignored. These descriptions are used informally and do not define the syntax requirements.

The second convention is a BNF-like grammar, used to define the formal URI syntax. The grammar is that of [RFC822], except that “|” is used to designate alternatives. Briefly, rules are separated from definitions by an equal “=” indentation is used to continue a rule definition over more than one line, literals are quoted with “ ”, parentheses “(” and “)” are used to group elements, optional elements are enclosed in “[” and “]” brackets, and elements may be preceded with <n>* to designate n or more repetitions of the following element; n defaults to 0.

Unlike many specifications that use a BNF-like grammar to define the bytes (octets) allowed by a protocol, the URI grammar is defined in terms of characters. Each literal in the grammar corresponds to the character it represents, rather than to the octet encoding of that character in any particular coded character set. How a URI is represented in terms of bits and bytes on the wire is dependent upon the character encoding of the protocol used to transport it, or the charset of the document which contains it.

The following definitions are common to many elements:

| | |
|---|---|
| alpha = | lowalpha \| upalpha |
| lowalpha = | “a” \| “b” \| “c” \| “d” \| “e” \| “f” \| “g” \| “h” \| “i” \| “j” \| “k” \| “l” \| “m” \| “n” \| “o” \| “p” \| “q” \| “r” \| “s” \| “t” \| “u” \| “v” \| “w” \| “x” \| “y” \| “z” |
| upalpha = | “A” \| “B” \| “C” \| “D” \| “E” \| “F” \| “G” \| “H” \| “I” \| “J” \| “K” \| “L” \| “M” \| “N” \| “O” \| “P” \| “Q” \| “R” \| “S” \| “T” \| “U” \| “V” \| “W” \| “X” \| “Y” \| “Z” |
| digit = | “0” \| “1” \| “2” \| “3” \| “4” \| “5” \| “6” \| “7” \| “8” \| “9” |
| alphanum = | alpha \| digit |

URI consist of a restricted set of characters, primarily chosen to aid transcribability and usability both in computer systems and in non-computer communications. Characters used conventionally as delimiters around URI were excluded. The restricted set of characters consists of digits, letters, and a few graphic symbols were chosen from those common to most of the character encodings and input facilities available to Internet users.

uric=reserved|unreserved|escaped

Within a URI, characters are either used as delimiters, or to represent strings of data (octets) within the delimited portions. Octets are either represented directly by a character (using the US-ASCII character for that octet [ASCII]) or by an escape encoding. This representation is elaborated below.

The relationship between URI and characters has been a source of confusion for characters that are not part of US-ASCII. To describe the relationship, it is useful to distinguish between a “character” (as a distinguishable semantic entity) and an “octet” (an 8-bit byte). There are two mappings, one from URI characters to octets, and a second from octets to original characters:

URI character sequence->octet sequence->original character sequence

A URI is represented as a sequence of characters, not as a sequence of octets. That is because URI might be “transported” by means that are not through a computer network, e.g., printed on paper, read over the radio, etc.

A URI scheme may define a mapping from URI characters to octets; whether this is done depends on the scheme. Commonly, within a delimited component of a URI, a sequence of characters may be used to represent a sequence of octets. For example, the character “a” represents the octet 97 (decimal), while the character sequence “%”, “0”, “a” represents the octet 10 (decimal).

There is a second translation for some resources: the sequence of octets defined by a component of the URI is subsequently used to represent a sequence of characters. A ‘charset’ defines this mapping. There are many charsets in use in Internet protocols. For example, UTF-8 [UTF-8] defines a mapping from sequences of octets to sequences of characters in the repertoire of ISO 10646.

In the simplest case, the original character sequence contains only characters that are defined in US-ASCII, and the two levels of mapping are simple and easily invertible: each ‘original character’ is represented as the octet for the US-ASCII code for it, which is, in turn, represented as either the US-ASCII character, or else the “%” escape sequence for that octet.

For original character sequences that contain non-ASCII characters, however, the situation is more difficult. Internet protocols that transmit octet sequences intended to represent character sequences are expected to provide some way of identifying the charset used, if there might be more than one [RFC2277]. However, there is currently no provision within the generic URI syntax to accomplish this identification. An individual URI scheme may require a singlecharset, define a default charset, or provide a way to indicate the charset used.

It is expected that a systematic treatment of character encoding within URI will be developed as a future modification of this specification.

Many URI include components consisting of or delimited by, certain special characters. These characters are called “reserved”, since their usage within the URI component is limited to their reserved purpose. If the data for a URI component would conflict with the reserved purpose, then the conflicting data must be escaped before forming the URI.

<table>
<tr><td>reserved =</td><td>“;” | “/” | “?” | “:” | “@” | “&” | “=” | “+” |<br>“$” | “,”</td></tr>
</table>

The “reserved” syntax class above refers to those characters that are allowed within a URI, but which may not be allowed within a particular component of the generic URI syntax; they are used as delimiters of the components described in Section 3.

Characters in the “reserved” set are not reserved in all contexts. The set of characters actually reserved within any given URI component is defined by that component. In general, a character is reserved if the semantics of the URI changes if the character is replaced with its escaped US-ASCII encoding.

Data characters that are allowed in a URI but do not have a reserved purpose are called unreserved. These include upper and lower case letters, decimal digits, and a limited set of punctuation marks and symbols.

<table>
<tr><td>unreserved =</td><td>alphanum | mark</td></tr>
<tr><td>mark =</td><td>“-” | “_” | “.” | “!” | “~” | “*” | “’” | “(” | “)”</td></tr>
</table>

Unreserved characters can be escaped without changing the semantics of the URI, but this should not be done unless the URI is being used in a context that does not allow the unescaped character to appear.

Data must be escaped if it does not have a representation using an unreserved character; this includes data that does not correspond to a printable character of the US-ASCII coded character set, or that corresponds to any US-ASCII character that is disallowed, as explained below.

An escaped octet is encoded as a character triplet, consisting of the percent character “%” followed by the two hexadecimal digits representing the octet code. For example, “%20” is the escaped encoding for the US-ASCII space character.

<table>
<tr><td>escaped =</td><td>“%” hex hex</td></tr>
<tr><td>hex =</td><td>digit | “A” | “B” | “C” | “D” | “E” | “F” |<br>“a” | “b” | “c” | “d” | “e” | “f”</td></tr>
</table>

A URI is always in an “escaped” form, since escaping or unescaping a completed URI might change its semantics. Normally, the only time escape encodings can safely be made is when the URI is being created from its component parts; each component may have its own set of characters that are reserved, so only the mechanism responsible for generating or interpreting that component can determine whether or not escaping a character will change its semantics. Likewise, a URI must be separated into its components before the escaped characters within those components can be safely decoded.

In some cases, data that could be represented by an unreserved character may appear escaped; for example, some of the unreserved “mark” characters are automatically escaped by some systems. If the given URI scheme defines a canonicalization algorithm, then unreserved characters may be unescaped according to that algorithm. For example, “%7e” is sometimes used instead of “~” in an http URL path, but the two are equivalent for an http URL.

Because the percent “%” character always has the reserved purpose of being the escape indicator, it must be escaped as “%25” in order to be used as data within a URI. Implementers should be careful not to escape or unescape the same string more than once, since unescaping an already unescaped string might lead to misinterpreting a percent data character as another escaped character, or vice versa in the case of escaping an already escaped string.

Although they are disallowed within the URI syntax, we include here a description of those US-ASCII characters that have been excluded and the reasons for their exclusion.

The control characters in the US-ASCII coded character set are not used within a URI, both because they are non-printable and because they are likely to be misinterpreted by some control mechanisms.

control=<US-ASCII coded characters 00-1F and 7F hexadecimal>

The space character is excluded because significant spaces may disappear and insignificant spaces may be introduced when URI are transcribed or typeset or subjected to the treatment of word-processing programs. Whitespace is also used to delimit URI in many contexts.

space=<US-ASCII coded character 20 hexadecimal>

The angle-bracket “<” and “>” and double-quote (“) characters are excluded because they are often used as the delimiters around URI in text documents and protocol fields. The character “#” is excluded because it is used to delimit a URI from a fragment identifier in URI references (Section 4). The percent character “%” is excluded because it is used for the encoding of escaped characters.

delims=“<”|“>”|“#”|“%”|<“>

Other characters are excluded because gateways and other transport agents are known to sometimes modify such characters, or they are used as delimiters.

unwise=“{”|“}”|“|”|“\”|“^|“[”|“]”|“`”

Data corresponding to excluded characters must be escaped in order to be properly represented within a URI.

The URI syntax is dependent upon the scheme. In general, absolute URI are written as follows:

<scheme>:<scheme-specific-part>

An absolute URI contains the name of the scheme being used (<scheme>) followed by a colon (":") and then a string (the <scheme-specific-part>) whose interpretation depends on the scheme.

The URI syntax does not require that the scheme-specific-part have any general structure or set of semantics which is common among all URI. However, a subset of URI do share a common syntax for representing hierarchical relationships within the namespace. This "generic URI" syntax consists of a sequence of four main components:

<scheme>://<authority><path>?<query> each of which, except <scheme>, may be absent from a particular URI.

For example, some URI schemes do not allow an <authority> component, and others do not use a <query> component.

absoluteURI=scheme ":" (hier_part|opaque_part)

URI that are hierarchical in nature use the slash "/" character for separating hierarchical components. For some file systems, a "/" character (used to denote the hierarchical structure of a URI) is the delimiter used to construct a file name hierarchy, and thus the URI path will look similar to a file pathname. This does NOT imply that the resource is a file or that the URI maps to an actual filesystem pathname.

| | |
|---|---|
| hier_part = | ( net_path \| abs_path ) [ "?" query ] |
| net_path = | "//" authority [ abs_path ] |
| abs_path = | "/" path_segments |

URI that do not make use of the slash "/" character for separating hierarchical components are considered opaque by the generic URI parser.

| | |
|---|---|
| opaque_part = | uric_no_slash *uric |
| uric_no_slash = | unreserved \| escaped \| ";" \| "?" \| ":" \| "@" \| "&" \| "=" \| "+" \| "$" \| "," |

We use the term <path> to refer to both the <abs_path> and <opaque_part> constructs, since they are mutually exclusive for any given URI and can be parsed as a single component.

Just as there are many different methods of access to resources, there are a variety of schemes for identifying such resources. The URI syntax consists of a sequence of components separated by reserved characters, with the first component defining the semantics for the remainder of the URI string.

Scheme names consist of a sequence of characters beginning with a lower case letter and followed by any combination of lower case letters, digits, plus ("+"), period ("."), or hyphen ("-") For resiliency, programs interpreting URI should treat upper case letters as equivalent to lower case in scheme names (e.g., allow "HTTP" as well as "http").

scheme=alpha*(alpha|digit|"+"|"–"|".")

Relative URI references are distinguished from absolute URI in that they do not begin with a scheme name. Instead, the scheme is inherited from the base URI, as described.

Many URI schemes include a top hierarchical element for a naming authority, such that the namespace defined by the remainder of the URI is governed by that authority. This authority component is typically defined by an Internet-based server or a scheme-specific registry of naming authorities.

authority=server|reg_name

The authority component is preceded by a double slash "//" and is terminated by the next slash "/", question-mark "?", or by the end of the URI. Within the authority component, the characters ";", ":", "@", "?", and "/" are reserved.

An authority component is not required for a URI scheme to make use of relative references. A base URI without an authority component implies that any relative reference will also be without an authority component.

The structure of a registry-based naming authority is specific to the URI scheme, but constrained to the allowed characters for an authority component.

| | |
|---|---|
| reg_name = | 1*( unreserved \| escaped \| "$" \| "," \| ";" \| ":" \| "@" \| "&" \| " =" \| "+" ) |

URL schemes that involve the direct use of an IP-based protocol to a specified server on the Internet use a common syntax for the server component of the URI's scheme-specific data:

<userinfo>@<host>:<port> where <userinfo> may consist of a user name and, optionally, scheme-specific information about how to gain authorization to access the server. The parts "<userinfo>@" and ":<port>" may be omitted.

server=[[userinfo "@"] hostport]

The user information, if present, is followed by a commercial at-sign "@".

| | |
|---|---|
| userinfo = | *( unreserved \| escaped \| ";" \| ":" \| "&" \| "=" \| "+" \| "$" \| "," ) |

Some URL schemes use the format "user:password" in the userinfo field. This practice is NOT RECOMMENDED, because the passing of authentication information in clear text (such as URI) has proven to be a security risk in almost every case where it has been used.

The host is a domain name of a network host, or its IPv4 address as a set of four decimal digit groups separated by ".". Literal IPv6 addresses are not supported.

| | |
|---|---|
| hostport = | host [ ":" port ] |
| host = | hostname \| IPv4address |
| hostname = | *( domainlabel "." ) toplabel [ "." ] |
| domainlabel = | alphanum \| alphanum *( alphanum \| "-" ) alphanum |
| toplabel = | alpha \| alpha *( alphanum \| "-" ) alphanum |
| IPv4address = | 1*digit "." 1*digit "." 1*digit "." 1*digit |
| port = | *digit |

Hostnames take the form described in [RFC1034] and [RFC1123]: a sequence of domain labels separated by ".", each domain label starting and ending with an alphanumeric character and possibly also containing "–" characters. The rightmost domain label of a fully qualified domain name will never start with a digit, thus syntactically distinguishing domain names from IPv4 addresses, and may be followed by a single "." if it is necessary to distinguish between the complete domain name and any local domain. To actually be "Uniform" as a resource locator, a URL hostname should be a fully qualified domain name. In practice, however, the host component may be a local domain literal.

A suitable representation for including a literal IPv6 address as the host part of a URL is desired, but has not yet been determined or implemented in practice.

The port is the network port number for the server. Most schemes designate protocols that have a default port number. Another port number may optionally be supplied, in decimal, separated from the host by a colon. If the port is omitted, the default port number is assumed.

The path component contains data, specific to the authority (or the scheme if there is no authority component), identifying the resource within the scope of that scheme and authority.

| | |
|---|---|
| path = | [ abs_path \| opaque_part ] |
| path_segments = | segment *( "/" segment ) |
| segment = | *pchar *( ";" param ) |
| param = | *pchar |
| pchar = | unreserved \| escaped \|<br>":" \| "@" \| "&" \| "=" \| "+" \| "$" \| "," |

The path may consist of a sequence of path segments separated by a single slash character. Within a path segment, the characters "/", ";", "=", and "?" are reserved. Each path segment may include a sequence of parameters, indicated by the semicolon ";" character. The parameters are not significant to the parsing of relative references.

The query component is a string of information to be interpreted by the resource.

query=*uric

Within a query component, the characters ";", "/", "?", ":", "@", "&", "=", "+", ",", and "$" are reserved.

The term "URI-reference" is used here to denote the common usage of a resource identifier. A URI reference may be absolute or relative, and may have additional information attached in the form of a fragment identifier. However, "the URI" that results from such a reference includes only the absolute URI after the fragment identifier (if any) is removed and after any relative URI is resolved to its absolute form. Although it is possible to limit the discussion of URI syntax and semantics to that of the absolute result, most usage of URI is within general URI references, and it is impossible to obtain the URI from such a reference without also parsing the fragment and resolving the relative form.

URI-reference=[absoluteURI|relativeURI]["#" fragment]

The syntax for relative URI is a shortened form of that for absolute URI, where some prefix of the URI is missing and certain path components ("." and "..") have a special meaning when, and only when, interpreting a relative path. The relative URI syntax is defined in Section 5.

When a URI reference is used to perform a retrieval action on the identified resource, the optional fragment identifier, separated from the URI by a crosshatch ("#") character, consists of additional reference information to be interpreted by the user agent after the retrieval action has been successfully completed. As such, it is not part of a URI, but is often used in conjunction with a URI.

fragment=*uric

The semantics of a fragment identifier is a property of the data resulting from a retrieval action, regardless of the type of URI used in the reference. Therefore, the format and interpretation of fragment identifiers is dependent on the media type [RFC2046] of the retrieval result. The character restrictions described for URI also apply to the fragment in a URI-reference. Individual media types may define additional restrictions or structure within the fragment for specifying different types of "partial views" that can be identified within that media type.

A fragment identifier is only meaningful when a URI reference is intended for retrieval and the result of that retrieval is a document for which the identified fragment is consistently defined.

A URI reference that does not contain a URI is a reference to the current document. In other words, an empty URI reference within a document is interpreted as a reference to the start of that document, and a reference containing only a fragment identifier is a reference to the identified fragment of that document. Traversal of such a reference should not result in an additional retrieval action. However, if the URI reference occurs in a context that is always intended to result in a new request, as in the case of HTML's FORM element, then an empty URI reference represents the base URI of the current document and should be replaced by that URI when transformed into a request.

A URI reference is typically parsed according to the four main components and fragment identifier in order to determine what components are present and whether the reference is relative or absolute. The individual components are then parsed for their subparts and, if not opaque, to verify their validity.

Although the BNF defines what is allowed in each component, it is ambiguous in terms of differentiating between an authority component and a path component that begins with two slash characters. The greedy algorithm is used for disambiguation: the left-most matching rule soaks up as much of the URI reference string as it is capable of matching. In other words, the authority component wins.

Readers familiar with regular expressions should see Appendix B for a concrete parsing example and test oracle.

It is often the case that a group or "tree" of documents has been constructed to serve a common purpose; the vast majority of URI in these documents point to resources within the tree rather than outside of it. Similarly, documents located at a particular site are much more likely to refer to other resources at that site than to resources at remote sites.

Relative addressing of URI allows document trees to be partially independent of their location and access scheme. For instance, it is possible for a single set of hypertext documents to be simultaneously accessible and traversable via each of the "file", "http", and "ftp" schemes if the documents refer to each other using relative URI. Furthermore, such document trees can be moved, as a whole, without changing any of the relative references. Experience within the WWW has demonstrated that the ability to perform relative referencing is necessary for the long-term usability of embedded URI.

The syntax for relative URI takes advantage of the <hier_part> syntax of <absoluteURI> in order to express a reference that is relative to the namespace of another hierarchical URI.

relativeURI=(net_path|abs_path|rel_path)["?" query]

A relative reference beginning with two slash characters is termed a network-path reference, as defined by <net_path>. Such references are rarely used.

A relative reference beginning with a single slash character is termed an absolute-path reference, as defined by <abs_path>.

A relative reference that does not begin with a scheme name or a slash character is termed a relative-path reference.

| | |
|---|---|
| rel_path = | rel_segment [ abs_path ] |
| rel_segment = | 1*( unreserved \| escaped \|<br>";" \| "@" \| "&" \| "=" \| "+" \| "$" \| "," ) |

Within a relative-path reference, the complete path segments "." and ".." have special meanings: "the current hierarchy level" and "the level above this hierarchy level", respectively. Although this is very similar to their use within Unix-based filesystems to indicate directory levels, these path components are only considered special when resolving a relative-path reference to its absolute form.

Authors should be aware that a path segment which contains a colon character cannot be used as the first segment of a relative URI path (e.g., "this:that"), because it would be mistaken for a scheme name.

It is therefore necessary to precede such segments with other segments (e.g., "./this:that") in order for them to be referenced as a relative path.

It is not necessary for all URI within a given scheme to be restricted to the <hier_part> syntax, since the hierarchical properties of that syntax are only necessary when relative URI are used within a particular document. Documents can only make use of relative URI when their base URI fits within the <hier_part> syntax. It is assumed that any document which contains a relative reference will also have a base URI that obeys the syntax. In other words, relative URI cannot be used within a document that has an unsuitable base URI.

Some URI schemes do not allow a hierarchical syntax matching the <hier_part> syntax, and thus cannot use relative references.

The term "relative URI" implies that there exists some absolute "base URI" against which the relative reference is applied. Indeed, the base URI is necessary to define the semantics of any relative URI reference; without it, a relative reference is meaningless. In order for relative URI to be usable within a document, the base URI of that document must be known to the parser.

The base URI of a document can be established in one of four ways, listed below in order of precedence. The order of precedence can be thought of in terms of layers, where the innermost defined base URI has the highest precedence. This can be visualized graphically as:

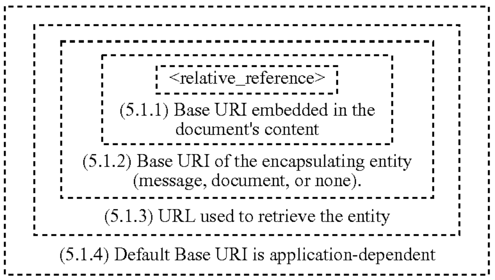

Within certain document media types, the base URI of the document can be embedded within the content itself such that it can be readily obtained by a parser. This can be useful for descriptive documents, such as tables of content, which may be transmitted to others through protocols other than their usual retrieval context (e.g., E-Mail or USENET news).

It is beyond the scope of this document to specify how, for each media type, the base URI can be embedded. It is assumed that user agents manipulating such media types will be able to obtain the appropriate syntax from that media type's specification. An example of how the base URI can be embedded in the Hypertext Markup Language (HTML) [RFC1866] is provided.

A mechanism for embedding the base URI within MIME container types (e.g., the message and multipart types) is defined by MHTML [RFC2110]. Protocols that do not use the MIME message header syntax, but which do allow some form of tagged metainformation to be included within messages, may define their own syntax for defining the base URI as part of a message.

If no base URI is embedded, the base URI of a document is defined by the document's retrieval context. For a document that is enclosed within another entity (such as a message or another document), the retrieval context is that entity; thus, the default base URI of the document is the base URI of the entity in which the document is encapsulated.

If no base URI is embedded and the document is not encapsulated within some other entity (e.g., the top level of a composite entity), then, if a URI was used to retrieve the base document, that URI shall be considered the base URI. Note that if the retrieval was the result of a redirected request, the last URI used (i.e., that which resulted in the actual retrieval of the document) is the base URI.

If none of the conditions described apply, then the base URI is defined by the context of the application. Since this definition is necessarily application-dependent, failing to define the base URI using one of the other methods may result in the same content being interpreted differently by different types of application.

It is the responsibility of the distributor(s) of a document containing relative URI to ensure that the base URI for that document can be established. It must be emphasized that relative URI cannot be used reliably in situations where the document's base URI is not well-defined.

This section describes an example algorithm for resolving URI references that might be relative to a given base URI.

The base URI is established according to the rules and parsed into the four main components. Note that only the scheme component is required to be present in the base URI; the other components may be empty or undefined. A component is undefined if its preceding separator does not appear in the URI reference; the path component is never undefined, though it may be empty. The base URI's query component is not used by the resolution algorithm and may be discarded.

For each URI reference, the following steps are performed in order:

1) The URI reference is parsed into the potential four components and fragment identifier, as described.
2) If the path component is empty and the scheme, authority, and query components are undefined, then it is a reference to the current document and we are done. Otherwise, the reference URI's query and fragment components are defined as found (or not found) within the URI reference and not inherited from the base URI.
3) If the scheme component is defined, indicating that the reference starts with a scheme name, then the reference is interpreted as an absolute URI and we are done. Otherwise, the reference URI's scheme is inherited from the base URI's scheme component.

Due to a loophole in prior specifications [RFC1630], some parsers allow the scheme name to be present in a relative URI if it is the same as the base URI scheme. Unfortunately, this can conflict with the correct parsing of non-hierarchical URI. For backwards compatibility, an implementation may work around such references by removing the scheme if it matches that of the base URI and the scheme is known to always use the <hier_part> syntax. The parser can then continue with the steps below for the remainder of the reference components. Validating parsers should mark such a misformed relative reference as an error.

4) If the authority component is defined, then the reference is a network-path and we skip to step 7. Otherwise, the reference URI's authority is inherited from the base URI's authority component, which will also be undefined if the URI scheme does not use an authority component.

5) If the path component begins with a slash character ("/"), then the reference is an absolute-path and we skip to step 7.

6) If this step is reached, then we are resolving a relative-path reference. The relative path needs to be merged with the base URI's path. Although there are many ways to do this, we will describe a simple method using a separate string buffer.

a) All but the last segment of the base URI's path component is copied to the buffer. In other words, any characters after the last (right-most) slash character, if any, are excluded.

b) The reference's path component is appended to the buffer string.

c) All occurrences of "./", where "." is a complete path segment, are removed from the buffer string.

d) If the buffer string ends with "." as a complete path segment, that "." is removed.

e) All occurrences of "<segment>/../", where <segment> is a complete path segment not equal to "..", are removed from the buffer string. Removal of these path segments is performed iteratively, removing the left-most matching pattern on each iteration, until no matching pattern remains.

f) If the buffer string ends with "<segment>/..", where <segment> is a complete path segment not equal to "..", that "<segment>/.." is removed.

g) If the resulting buffer string still begins with one or more complete path segments of "..", then the reference is considered to be in error. Implementations may handle this error by retaining these components in the resolved path (i.e., treating them as part of the final URI), by removing them from the resolved path (i.e., discarding relative levels above the root), or by avoiding traversal of the reference.

h) The remaining buffer string is the reference URI's new path component.

7) The resulting URI components, including any inherited from the base URI, are recombined to give the absolute form of the URI reference. Using pseudocode, this would be

```
result = ""
if scheme is defined then
    append scheme to result
    append ":" to result
if authority is defined then
    append "//" to result
    append authority to result
append path to result
if query is defined then
    append "?" to result
    append query to result
if fragment is defined then
    append "#" to result
    append fragment to result
return result
```

Note that we must be careful to preserve the distinction between a component that is undefined, meaning that its separator was not present in the reference, and a component that is empty, meaning that the separator was present and was immediately followed by the next component separator or the end of the reference.

The above algorithm is intended to provide an example by which the output of implementations can be tested—implementation of the algorithm itself is not required. For example, some systems may find it more efficient to implement step 6 as a pair of segment stacks being merged, rather than as a series of string pattern replacements.

Note: Some WWW client applications will fail to separate the reference's query component from its path component before merging the base and reference paths in step 6 above. This may result in a loss of information if the query component contains the strings "/../" or "/./".

In many cases, different URI strings may actually identify the identical resource. For example, the host names used in URL are actually case insensitive, and the URL <http://www.XEROX.com> is equivalent to <http://www.xerox.com>. In general, the rules for equivalence and definition of a normal form, if any, are scheme dependent. When a scheme uses elements of the common syntax, it will also use the common syntax equivalence rules, namely that the scheme and hostname are case insensitive and a URL with an explicit ":port", where the port is the default for the scheme, is equivalent to one where the port is elided.

A URI does not in itself pose a security threat. Users should beware that there is no general guarantee that a URL, which at one time located a given resource, will continue to do so. Nor is there any guarantee that a URL will not locate a different resource at some later point in time, due to the lack of any constraint on how a given authority apportions its namespace. Such a guarantee can only be obtained from the person(s) controlling that namespace and the resource in question. A specific URI scheme may include additional semantics, such as name persistence, if those semantics are required of all naming authorities for that scheme.

It is sometimes possible to construct a URL such that an attempt to perform a seemingly harmless, idempotent operation, such as the retrieval of an entity associated with the resource, will in fact cause a possibly damaging remote operation to occur. The unsafe URL is typically constructed by specifying a port number other than that reserved for the network protocol in question. The client unwittingly contacts a site that is in fact running a different protocol. The content of the URL contains instructions that, when interpreted according to this other protocol, cause an unexpected operation. An example has been the use of a gopher URL to cause an unintended or impersonating message to be sent via a SMTP server.

Caution should be used when using any URL that specifies a port number other than the default for the protocol, especially when it is a number within the reserved space.

Care should be taken when a URL contains escaped delimiters for a given protocol (for example, CR and LF characters for telnet protocols) that these are not unescaped before transmission. This might violate the protocol, but avoids the potential for such characters to be used to simulate an extra operation or parameter in that protocol, which might lead to an unexpected and possibly harmful remote operation to be performed. It is clearly unwise to use a URL that contains a password which is intended to be secret. In particular, the use of a password within the 'userinfo' component of a URL is strongly disrecommended except in those rare cases where the 'password' parameter is intended to be public.

The invention claimed is:

1. A method of managing multiple resource identifiers in a machine readable document, comprising:

allocating one or more resource identifiers to a context, each resource identifier identifying where a corresponding resource is available for retrieval, the context specifying a common name for a group of resources, wherein the context comprises a plurality of sub-set contexts, each of the plurality of sub-set contexts being allocated to different resource identifiers and resolving different resources available for retrieval;

assigning a context name to the context;

associating the one or more resource identifiers and corresponding context name in the document;

applying a transformation to the machine readable document, wherein the transformation affects the context; and updating the corresponding resource identifier associated with the context without updating the plurality of sub-set contexts.

2. A method as claimed in claim 1 further comprising populating a context map with mappings of context names to corresponding resource locators.

3. A method as claimed in claim 2 in which the context map is incorporated in the machine readable document.

4. A method as claimed in claim 1 in which at least one first context comprises as a sub-set a second context.

5. A method as claimed in claim 4 further comprising populating a context map with mappings from the second context to the first context.

6. A method as claimed in claim 1 further comprising including in a resource identifier a processor identifiable component indicating a resolvable resource identifier.

7. A method as claimed in claim 1 in which at least one first context comprises as a sub-set a second context and in which a processor identifiable component indicating a resolvable resource identifier is included in a resource identifier associated with the second context.

8. A method as claimed in claim 1 in which the machine readable document comprises an extended markup language (XML) document.

9. A method as claimed in claim 1 further comprising applying a transformation to the machine readable document.

10. A method as claimed in claim 9 in which the transformation comprises at least one transformation selected from the group of: moving a document, moving a resource, and merging multiple documents.

11. A method as claimed in claim 2 wherein the transformation affects a context, updating the corresponding resource locator in the context map accordingly without changing references to said affected context in the document.

12. A method as claimed in claim 7 wherein the transformation affects the first context, updating the corresponding resource locator associated with said first context in the context map without updating the second, sub-set context or changing references to said first and second contexts in the document.

13. A method as claimed in claim 1 implemented by a processor operating under instructions contained in a computer readable medium.

14. A non-transitory computer readable medium storing therein a machine readable document containing multiple resource identifiers in which one or more resource identifiers are allocated to a context having a context name and in which a resource identifier is associated with the corresponding context name in the document, wherein each resource identifier includes a processor identifiable component indicating a resolvable resource identifier, wherein the context comprises a plurality of sub-set contexts, each of the plurality of sub-set contexts being allocated to different resource identifiers and resolves different resources available for retrieval, wherein each resource identifier identifies where a corresponding resource is available for retrieval, and the context specifies a common name for a group of resources, and each resource identifier associated with the context is updated without updating the plurality of sub-set contexts when a transformation to the machine readable document affects the context.

15. A non-transitory computer readable medium as claimed in claim 14, said document further comprising including a context map mapping a context name to a corresponding resource locator.

16. A non-transitory computer readable medium as claimed in claim 14, in which at least one first context comprises, as a sub-set, a second context.

17. A non-transitory computer readable medium as claimed in claim 16, said document further comprising a context map mapping the second context to the first context.

18. A non-transitory computer readable medium as claimed in claim 14, said document comprising an Extensible Markup Language (XML) document.

19. An apparatus for managing multiple resource identifiers in a machine readable document comprising a processor configured to operate under instructions contained in a computer readable medium to implement the method of claim 1.

20. A non-transitory computer readable medium containing instructions arranged to operate a processor to implement the method of claim 1.

21. A method as claimed in claim 1, wherein more than one resource identifiers are allocated to the context.

22. A method of managing multiple resource identifiers in a machine readable document, said method comprising:

allocating at least one of said resource identifiers to a context, each resource identifier identifying where a corresponding resource is available for retrieval, the context specifying a common name for a group of resources;

assigning a context name to the context;

including in the document a plurality of processor-resolvable references, and each of the plurality of processor-resolvable references associates with the corresponding context name and different resource identifier;

populating a context map in the machine readable document with at least one map entry that maps the context name to a corresponding resource locator; and in response to a transformation applied to the document and where the transformation affects the context, updating the corresponding resource locator in said at least one map entry of the context map without changing the plurality of processor-resolvable references in the document.

23. A method as claimed in claim 22, further comprising:

allocating said context, as a sub-set, to a further context;

assigning a further context name to said further context;

populating the context map with at least a further map entry that maps the further context name to a corresponding resource locator; and resolving said at least one reference based on both said context and said further context.

24. A method as claimed in claim 23, further comprising:

in response to a transformation applied to the document and where the transformation affects the further context only, updating the corresponding resource locator in said at least one further map entry of the context map without changing said at least one reference in the document and without updating the corresponding resource locator in said at least one map entry of the context map.

25. A method as claimed in claim 23, further comprising:

in response to a transformation applied to the document and where the transformation affects the context only, updating the corresponding resource locator in said at least one map entry of the context map without changing said at least one reference in the document and without updating the corresponding resource locator in said at least one further map entry of the context map.

* * * * *